(12) United States Patent
Iwamoto et al.

(10) Patent No.: US 9,033,691 B2
(45) Date of Patent: May 19, 2015

(54) TIRE VULCANIZER

(71) Applicants: Tomoyuki Iwamoto, Tokyo (JP); Kunio Matsunaga, Tokyo (JP); Koji Shintani, Tokyo (JP); Yoshikatsu Hineno, Tokyo (JP)

(72) Inventors: Tomoyuki Iwamoto, Tokyo (JP); Kunio Matsunaga, Tokyo (JP); Koji Shintani, Tokyo (JP); Yoshikatsu Hineno, Tokyo (JP)

(73) Assignee: MITSUBISHI HEAVY INDUSTRIES MACHINERY TECHNOLOGY CORPORATION, Hiroshima-shi, Hiroshima (JP)

( * ) Notice: Subject to any disclaimer, the term of this patent is extended or adjusted under 35 U.S.C. 154(b) by 0 days.

(21) Appl. No.: 14/001,798

(22) PCT Filed: Nov. 2, 2012

(86) PCT No.: PCT/JP2012/078464
§ 371 (c)(1),
(2) Date: Aug. 27, 2013

(87) PCT Pub. No.: WO2013/114692
PCT Pub. Date: Aug. 8, 2013

(65) Prior Publication Data
US 2014/0057009 A1 Feb. 27, 2014

(30) Foreign Application Priority Data
Feb. 3, 2012 (JP) ................. 2012-022370

(51) Int. Cl.
*B29C 33/22* (2006.01)
*B29D 30/06* (2006.01)
(Continued)

(52) U.S. Cl.
CPC .......... *B29D 30/0606* (2013.01); *B29C 33/202* (2013.01); *B29D 30/0662* (2013.01); *B29L 2030/00* (2013.01); *B29C 33/22* (2013.01)

(58) Field of Classification Search
CPC ...... B29C 33/202; B29C 33/22; B29C 33/24; B29D 30/0601; B29D 30/0662
USPC ................. 425/34.1, 47, 195, 451.9
See application file for complete search history.

(56) References Cited

U.S. PATENT DOCUMENTS 3,606,638 A * 9/1971 Putkowski .................... 425/195
3,862,596 A * 1/1975 Putkowski ................. 425/451.9
(Continued)

FOREIGN PATENT DOCUMENTS

CN 103347667 A 10/2013
JP S62-222809 A 9/1987
(Continued)

OTHER PUBLICATIONS
International Search Report; PCT/ISA/210 of PCT/JP2012/078464; Mailing Date Jan. 29, 2013.
(Continued)

*Primary Examiner* — James Mackey
(74) *Attorney, Agent, or Firm* — Benjamin Hauptman; Manabu Kanesaka; Kenneth Berner

(57) ABSTRACT

What is provided is a tire vulcanizer, in which the stress force during engagement of the teeth can be reduced and teeth damage can be suppressed, allowing down-sizing, light-weighting, and simplifying at the same time. It includes: an upper mold attaching part (21) to which an upper mold is attached; a lower mold attachment part to which a lower mold pressed on the upper mold is attached; a supporting part (5) that supports the upper mold attaching part (21) and the lower mold attaching part; a fixed side rack (6) having first teeth (6a) arranged in a height direction and provided to the supporting part (5); a movable-side rack (7) having second teeth (7a) engaging with the first teeth and provided to the upper mold attaching part (21); and a tilting restriction part (40) restricting tilt of the movable-side rack (7) derived from the height direction.

13 Claims, 17 Drawing Sheets

(51) Int. Cl.
   *B29C 33/20* (2006.01)
   *B29L 30/00* (2006.01)

(56) References Cited

U.S. PATENT DOCUMENTS

| | | | | |
|---|---|---|---|---|
| 4,245,971 | A * | 1/1981 | MacMillan | 425/47 |
| 4,453,902 | A * | 6/1984 | Imbert | 425/47 |
| 6,506,044 | B1 * | 1/2003 | Francesco | 425/451.9 |
| 8,714,954 | B2 * | 5/2014 | Agawa | 425/47 |

FOREIGN PATENT DOCUMENTS

| | | |
|---|---|---|
| JP | H06-315940 | 11/1994 |
| JP | 2008-290334 A | 12/2008 |
| JP | 2010-241090 A | 10/2010 |
| JP | 2013-006335 A | 1/2013 |

OTHER PUBLICATIONS

Written Opinion of the International Search Authority; PCT/ISA/237 of PCT/JP2012/078464; Mailing Date Jan. 29, 2013.

China Patent Office, "Office Action for CN 201280010790.0," Dec. 3, 2014.

Japan Patent Office, "Office Action for JP 2012-022370," Dec. 16, 2014.

* cited by examiner

TIRE VULCANIZER

TECHNICAL FIELD

The present invention relates to a tire vulcanizer that vulcanizes an un-vulcanized tire in a mold.

Priority is claimed on Japanese Patent Application No. 2012-022370, filed Feb. 3, 2012, the content of which is incorporated herein by reference.

BACKGROUND ART

The tire vulcanizer is an apparatus that manufactures a vulcanized tire by vulcanizing a natural rubber tire, which is molded into a shape similar to a final product in advance to turn it into a shape of a completed tire. The vulcanization can be performed by heating and pressuring the natural rubber tire by placing it between upper and lower molds to sandwich it. To prevent the upper and lower molds from being opened due to the reaction force of the pressure, the upper and lower molds are fixed to a guide frame, a column, or the like in the tire vulcanizer.

In Patent Literature 1, a tire press (a tire vulcanizer) is disclosed. The tire vulcanizer has a movable locking part having a teeth surface, which is provided on the side surface of the upper mold, and a fixed locking part having a teeth surface matching with the teeth surface of the movable locking part, which is provided to a side frame placed on the side of the upper mold. The tightening force of the molds can be obtained with the movable and fixed locking parts by engaging them in the tire press.

Because of the above-explained configuration, there is no need to obtain the tightening force of the molds from the entire frame of the tire press. Thus, the tire press can be down-sized, reduced in weight, and simplified.

RELATED ART DOCUMENT

Patent Literature

Patent Literature 1: Japanese Unexamined Patent Application, First Publication No. S62-222809

DISCLOSURE OF INVENTION

Problems to be Solved by the Invention

In the tire vulcanizer (tire press) of the Patent Literature 1 (PTL 1), detail structures of the movable and fixed locking parts are not disclosed. However, tilting moment derived from the height direction is formed when the pressure reaction force, which is a reaction force against the tightening force of the molds, is provided to the movable locking part since the movable locking part is extended in the height direction. Thus, the teeth surfaces could be damaged because of stress formation due to a bending moment on the teeth surfaces of the movable and fixed locking parts or improper engagement of them at a proper position.

The present invention has been made under the circumstance described above. The purpose of the present invention is to provide a tire vulcanizer, in which the stress force during engagement of the teeth can be reduced and teeth damage can be suppressed, allowing down-sizing, light-weighting, and simplifying the vulcanizer at the same time.

Means for Solving the Problems

To solve the problems mentioned above, the present invention has the following aspects.

A tire vulcanizer including: a first mold attaching part to which a first mold is attached; a second mold attachment part to which a second mold pressed on the first mold is attached; a supporting part configured to support the first mold attaching part and the second mold attaching part; a first rack, which has a plurality of a first tooth arranged in a pressing direction in which the first mold attaching part and the second mold attaching part are pressed on each other, the first rack being provided to the supporting part; a second rack, which has a plurality of a second tooth capable of engaging with the plurality of the first tooth of the first rack, the second rack being provided to the first mold attaching part or the second mold attaching part; and a tilting restriction part configured to restrict tilt of the second rack derived from the pressing direction.

In the tire vulcanizer configured as described above, when force is placed in the pressing direction, the force is supported by the first mold attaching part and the second mold attaching part by the first tooth and the second tooth being engaged. In other words, the strength-providing member can be formed from a part of the vulcanizer, such as the first rack, the second rack, and the supporting part. Thus, overall apparatus of the vulcanizer can be down-sized, reduced in weight, and simplified.

When the second rack is received force in the pressing direction via the first mold attaching part or the second mold attaching part, a moment tilting the second rack relative to the pressing direction is generated. The tilting restriction part restricts the tilt by supporting the second rack, reducing the moment. In other words, the engaging state between the first and second tooth can be stabilized because the first teeth of the first rack and the second teeth of the second rack engage each other in a state where the first and second racks stand straight up relative to the pressing direction. Thus, the bending moment subjected to on the first and second teeth can be reduced. Moreover, the engaging location between the first and second teeth can be restricted by the tilting restriction part configured as described above. In other words, contacting between a tip of the first teeth and a bottom of the second teeth can be prevented. Additionally, too much separation between the tip and the bottom can be prevented. In this point, the bending moment subjected to on the first and the second teeth can be reduced.

In the tire vulcanizer describe above, a point of effort of a force acting on the second rack from the first mold attaching part or the second mold attaching part in the pressing direction may be set to a location closer to the first rack than a central part in an engaging direction in which the first tooth and the second tooth engage each other.

The moment arm between the application point of the force, which is the first and second teeth, and the above-mentioned point of effort can be kept in a short distance by setting the point of effort of the force placed in the pressing direction closer to the first rack side than the central part in the engaging direction. Thus, the bending moment can be reduced further. Therefore, the stress force generated in the first and second teeth during their engagement can be reduced, suppressing damaging of the teeth.

In the tire vulcanizer described above, the tilting restriction part may include a contacting part configured to contact a tip of the first tooth in a state where the first tooth and the second tooth engage each other, the contacting part being provided to the second rack to protrude to an opposite side of a side where a force received from the first mold attaching part or the second mold attaching part in the pressing direction is placed.

The inclination can be restricted and the moment can be reduced by having the part, which contacts to the tip of the first teeth, support the second rack when the moment is generated in the second rack. It also restricts the location of the first and second teeth in the engaging direction. Thus, the moment subjected to on the first and second teeth can be reduced, and the stress force generated in the first and second teeth during their engagement can be reduced reliably, suppressing the damaging of the teeth.

In the tire vulcanizer described above, the tilting restriction part may include a second rack supporting part configured to support the second rack from an opposite side of the second tooth in an engaging direction in which the first tooth and the second tooth engage each other.

The moment of the second rack can be reduced by supporting the second rack and restricting its tilt with the supporting part configured to support the second rack in the opposite side of the engaging direction relative to the second teeth as described above. The location of the first and second teeth in the engaging direction is also restricted. Therefore, the stress force generated in the first and second teeth during their engagement can be reduced reliably, and damaging of the teeth can be suppressed.

In the tire vulcanizer described above, the tilting restriction part may include a holding part configured to hold the first rack and the second rack in a state where the first tooth and the second tooth engage each other.

The tilt is restricted by supporting the second rack with the holding part configured to hold the first and second rack, reducing the moment of the second rack. The location of the first and second teeth in the engaging direction is also restricted. Therefore, the stress force generated in the first and second teeth during their engagement can be reduced reliably, and damaging of the teeth can be suppressed.

Effects of the Invention

According to the tire vulcanizer, which is an aspect of the present invention, the tire vulcanizer can be down-sized, reduced in weight, and simplified. At the same time, tilt of the second rack can be restricted with the tilting restriction part. Also, the location of the engagement of the teeth can be restricted. Also, bending moment subjected to on the first and second teeth can be reduced. Thus, the stress force during engagement of the teeth can be reduced and damaging of the teeth can be suppressed.

BRIEF DESCRIPTION OF THE DRAWINGS

FIG. 8 indicates a state after a certain operation from FIG. 7.

FIG. 9 indicates a state after a certain operation from FIG. 8.

BEST MODE FOR CARRYING OUT THE INVENTION

The tire vulcanizing apparatus 1, which relates the first embodiment of the present invention, is explained below in reference to FIGS. 1 to 10.

The tire vulcanizing apparatus 1 includes one or more of tire vulcanizers (in this embodiment, there are two tire vulcanizers 2A and 2B). Each of the tire vulcanizers 2A and 2B perform vulcanizing treatment to the un-vulcanized tire 32 to obtain the vulcanized tire 33.

Figure 1:
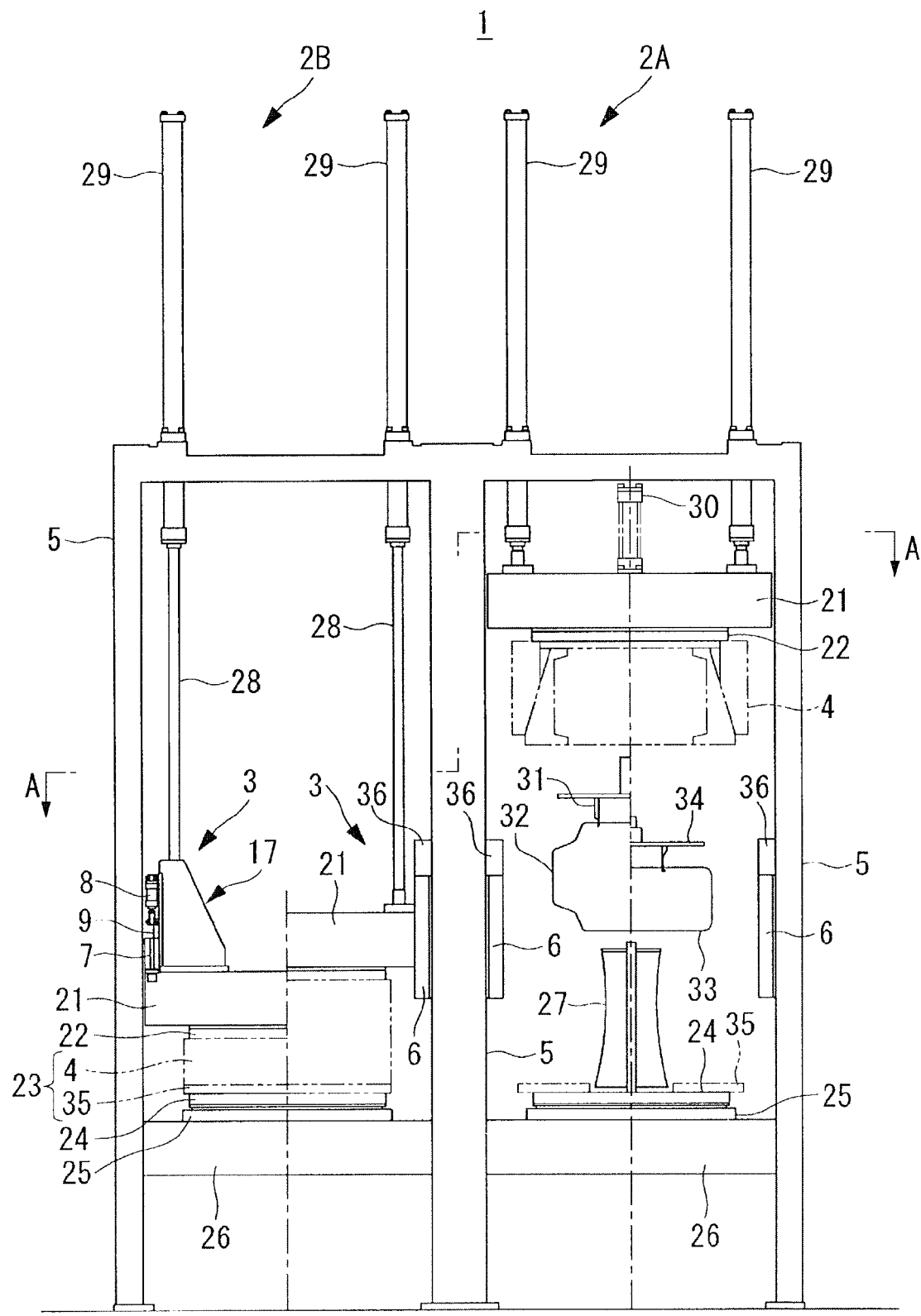
FIG. 1 is a front view of the tire vulcanizing apparatus related to the first embodiment of the present invention.
Figure 2:
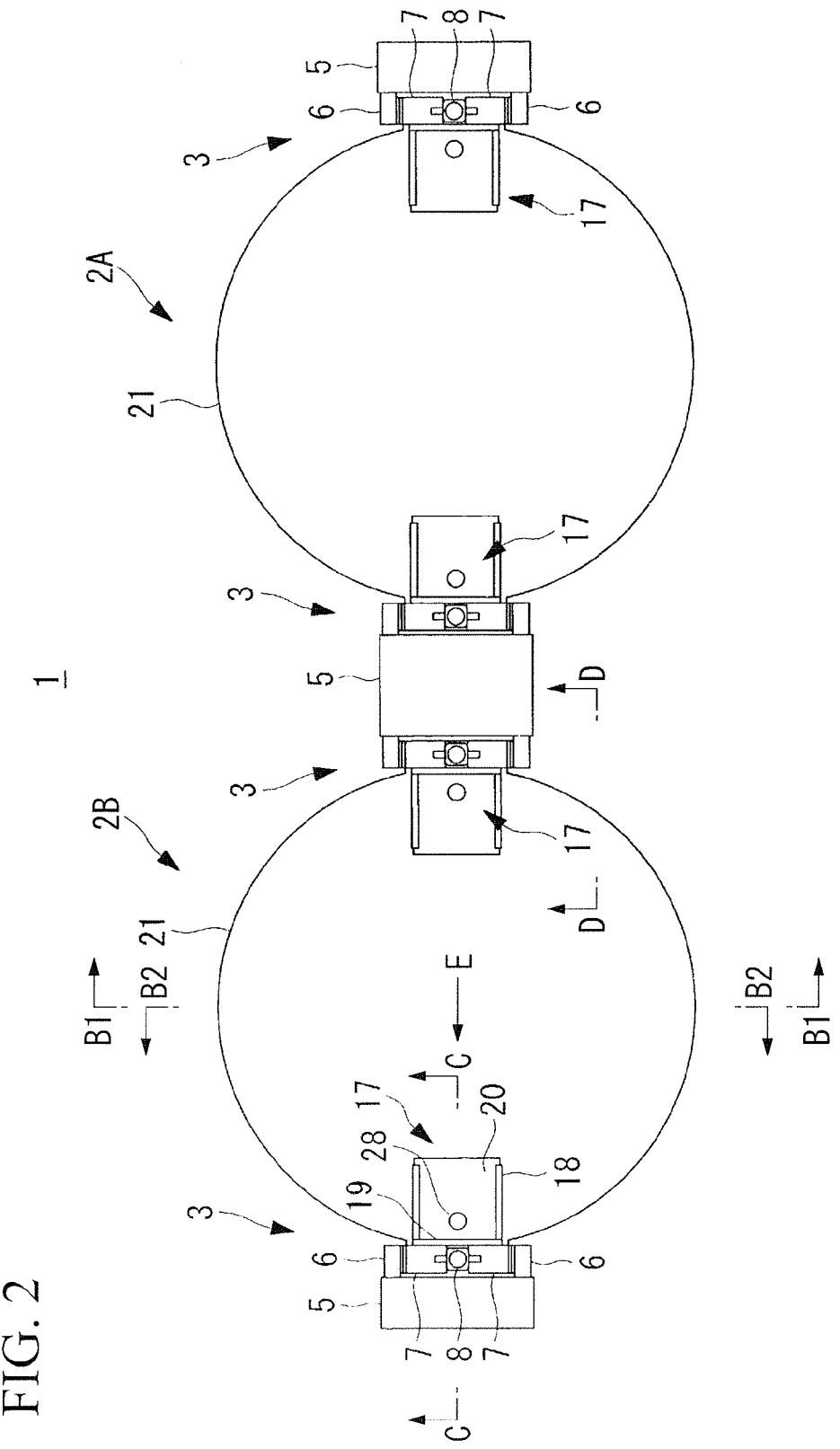
FIG. 2 is a cross-sectional view in A-A plane.

As shown in FIGS. 1 and 2, the upper mold attaching part (first mold attaching part) 21 and the lower mold attaching part (second mold attaching part) 26 are provided to each of the tire vulcanizers 2A and 2B. The upper and lower mold attaching parts sandwich the un-vulcanized tire 32 vertically. Each of the tire vulcanizers 2A and 2B also include the gate-shaped guide frame (supporting part) 5, which support the upper mold attaching part (first mold attaching part) 21 and the lower mold attaching parts (second mold attaching part) 26 from outside.

Further, as shown in FIGS. 1, 2, 7, 8 and 9, each of the tire vulcanizers 2A and 2B includes: the pressure support pat 3 having the fixed side rack (first rack) 6 and the movable-side rack (second rack) 7, which are capable of retaining the pressing force to the mold 23; and the tilting restriction part 40 that restricts tilt of the movable-side rack 7.

The mold 23 presses the un-vulcanized tire 32 in a state where the un-vulcanized tire 32 is sandwiched vertically in the height direction. Depending on the size of the produced tire, the sizes of the mold 23 are changed.

The mold 23 includes the upper mold (first mold) 4, which is located above the un-vulcanized tire 32, and the lower mold (second mold), which is located below the un-vulcanized tire 32. Thus, the height direction is the pressing direction of the upper mold 4 and the lower mold 35.

As shown in the right side of FIG. 1, the tire vulcanizer 2A includes the loader 31 and unloader 34 above the un-vulcanized tire 32 and the vulcanized tire 33, respectively. The loader 31 brings in the un-vulcanized tire 32 to the tire vulcanizers 2A, 2B before the vulcanizing treatment. The unloader 34 brings out the vulcanized tire 33 from the tire vulcanizers 2A, 2B after the vulcanizing treatment. Thus, the un-vulcanized tire 32 can be brought in to the mold 23, and the vulcanized tire 33 can be brought out from the mold 23.

The left half and the right half indicate the states before and after the vulcanizing treatment, respectively, in the tire vulcanizer 2A shown in the right side of FIG. 1. The tire vulcanizer 2B shown in the left side of FIG. 1 indicates the state during the vulcanizing treatment. The left half of the vulcanizer 2B indicates the case in which the height of the mold 23 is short and width of the produced tire is narrow. The right half of the vulcanizer 2B indicates the case in which the height of the mold 23 is long and width of the produced tire is wide.

In the lower part, the upper mold attaching part 21 is attached to the upper mold 4 through the upper platen 22 to support the upper mold 4. In the upper part, the upper mold attaching part 21 is connected to the lower end of the cylinder rod 28, which moves in to and out from the lifting cylinder 29 provided to the upper part of the guide frame 5. Thus, the upper mold 4 can be moved up and down by the lifting cylinder 29 with the upward and downward movement of the upper mold attaching part 21.

Further, the upper mold operating apparatus 30 is provided to the upper part of the upper mold attaching part 21 in a position that does not interfere with the lifting cylinder 29. Because of the action of the upper mold operating apparatus 30, the upper mold 4 can be opened and closed.

In the upper part, the lower mold attaching part 26 is attached to the lower mold 35 through the pressure cylinder 25 and the lower platen 24 to support the lower mold 35. The lower mold attaching part 26 is supported by the guide frame 5 at outer side ends.

On the upper surface of the lower mold 35, the thin-layered bladder 27, which is in an elastic body, is provided. High-temperature, high-pressure steam or the like can be introduced in the bladder 27. During the vulcanizing treatment, the high-temperature, high-pressure steam heats and presses the un-vulcanized tire 32 from inside through the bladder 27 to push the tire on the mold 23.

The guide frame 5 is in a gate shape. It is placed and fixed on the surface that the tire vulcanizing apparatus 1 is installed. The guide frame 5 supports the upper mold attaching part 21 in the upper part through the lifting cylinder 29. Also, it supports the lower mold 35 at both side ends through the lower mold attaching part 26.

Next, the pressure retaining part 3 is explained in reference to FIGS. 1 to 10.

Height of the upper mold attaching part 21, which is set at a predetermined height during the vulcanizing treatment, is adjusted with the pressure retaining part 3. Also, the pressure retaining part 3 is capable of fixing and holding the upper attaching part 21 at the predetermined height.

The pressure retaining part 3 includes: the fixing-side rack 6, which is provided to the side part of the guide frame 5; the movable-side rack 7, which is provided above the upper mold attaching part 21 and connected to the upper mold attaching part 21; the bracket 17, which allows the fixed side rack 6 and the movable-side rack 7 to be engaged each other; the cylinder 8; the height adjusting part 14; the cylinder 15; and the like.

Figure 6:
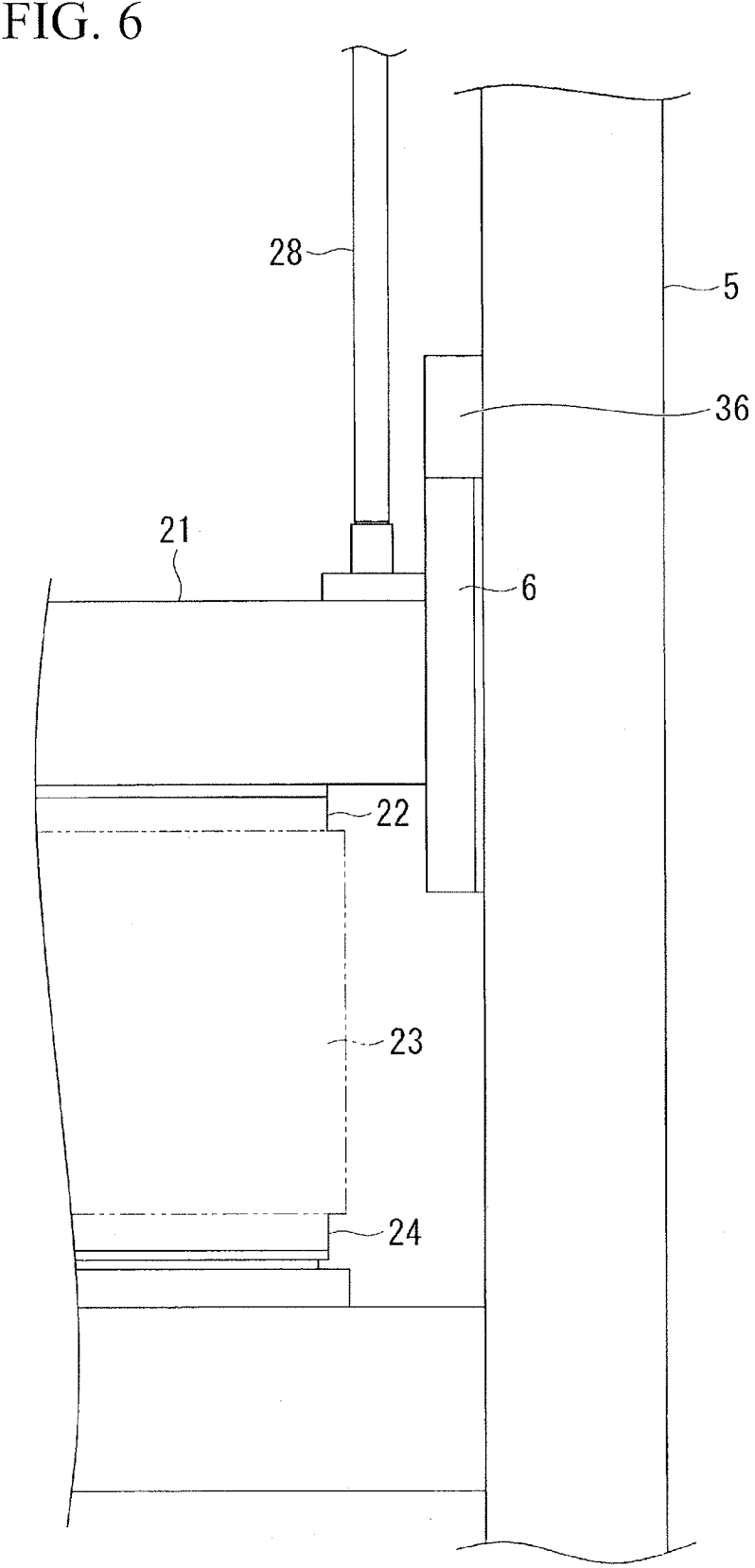
FIG. 6 is a cross-sectional view in D-D plane in FIG. 2 and indicates an enlarged view of a peripheral area of the pressure retaining part of the tire vulcanizing apparatus related to the first embodiment of the present embodiment.

The fixing-side rack 6 is a rack in which the first teeth 6a are arrayed in the height direction in a direction. The fixing-side rack 6 is supported on its upper part by the rack fixing part 36, which is provided to the side part of the guide frame to protrude to the inside of the guide frame 5, as shown in FIGS. 1 and 6.

Figure 3:
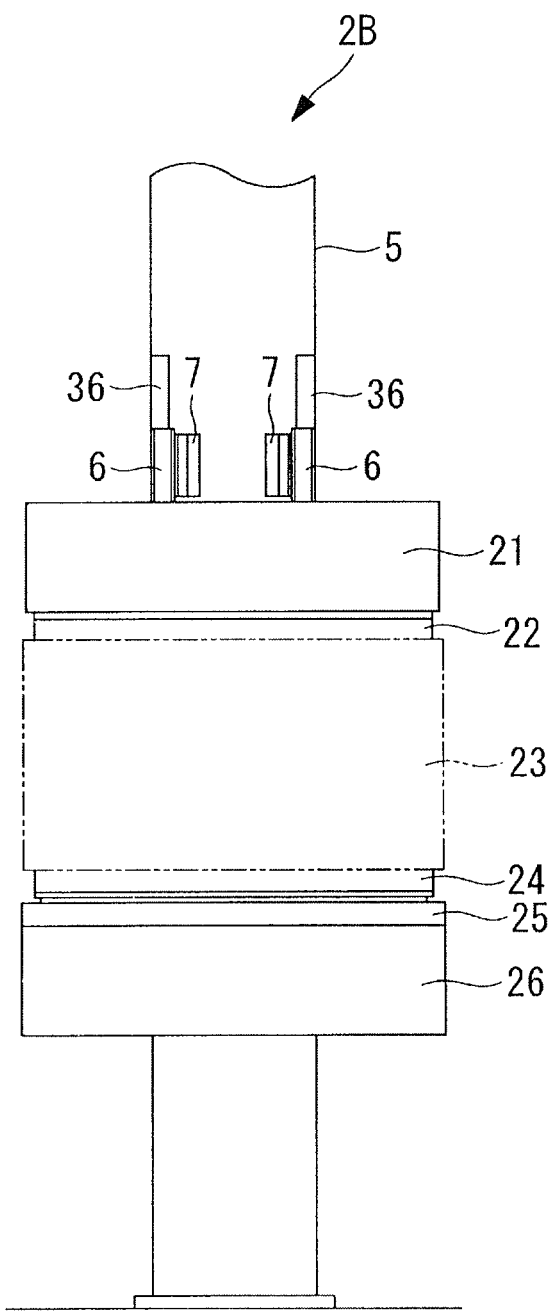
FIG. 3 is a cross-sectional view in B1-B1 plane in FIG. 2.
Figure 4:
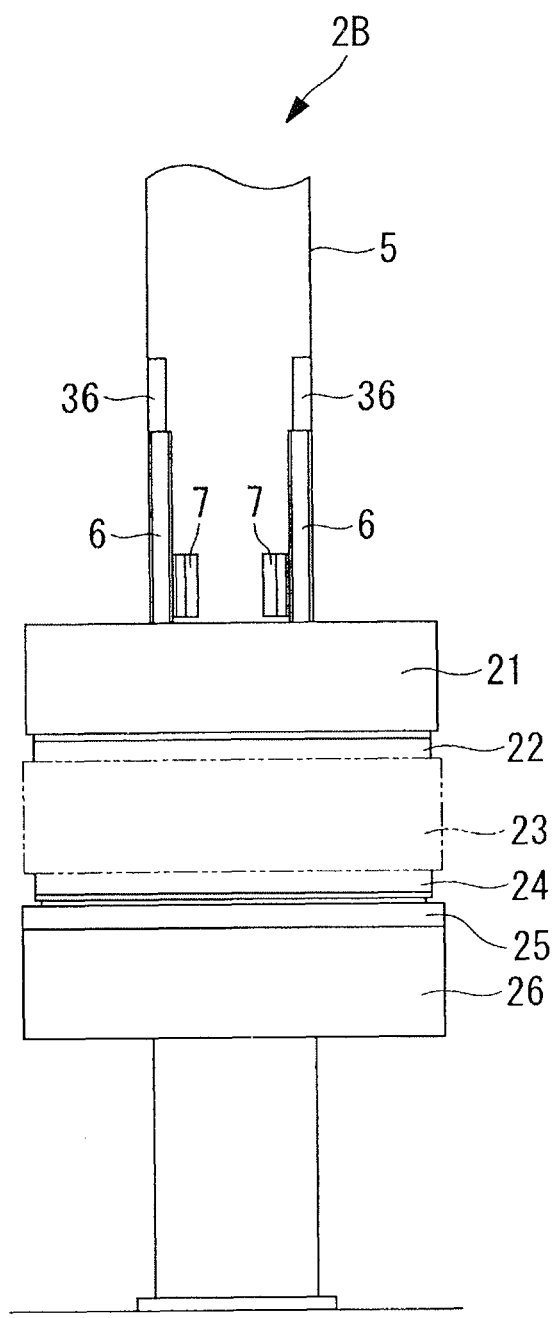
FIG. 4 is a cross-sectional view in B2-B2 plane in FIG. 2.

The movable-side rack 7 is a rack in which the second teeth 7a are arrayed in the height direction in a direction. The second teeth 7a are provided to the movable-side rack 7 to face the first teeth 6a of the fixing-side rack 6 as shown in FIGS. 2 to 4.

Figure 10:
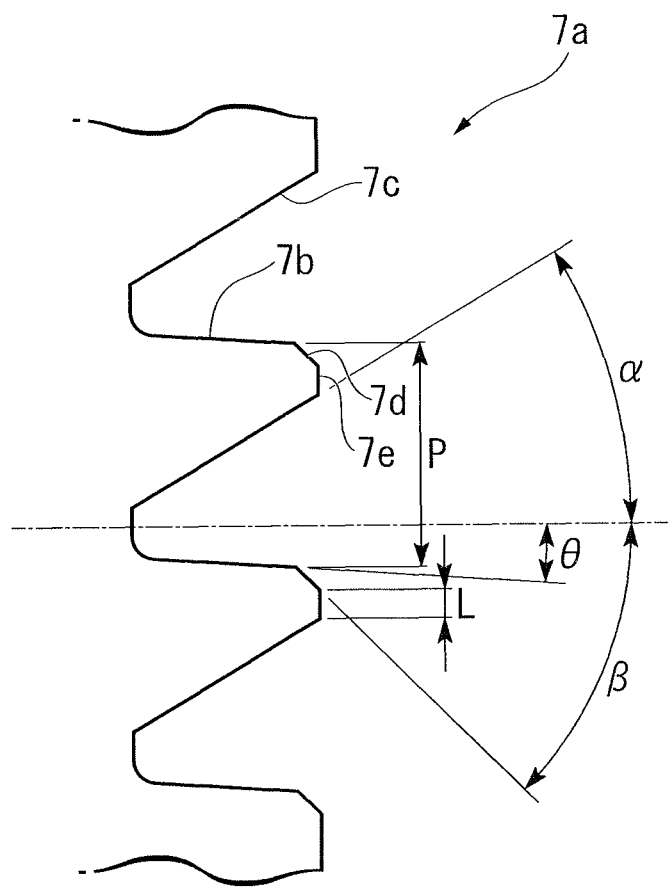
FIG. 10 indicates an enlarged view of the second teeth of the movable-side rack, which relates to the pressure retaining part of the tire vulcanizing apparatus related to the first embodiment of the present invention.

In the shape of the second tooth 7a of the movable-side rack 7 shown in FIG. 10, the lower surface 7c is inclined upward in the height direction in the inclination angle α relative to the engaging direction, which is the horizontal direction and a direction that the first teeth 6a and the second teeth 7a engage in. It is preferable that the inclination angle α is set in a range of 30° to 55°. Also, the inclination angle α may be set to 0° even though such a configuration is not indicated in the drawing. In this case, the lower surface 7c is parallel to the horizontal direction.

The upper surface 7b of the second tooth 7a is inclined downward in the inclination angle θ in the height direction relative to the horizontal direction. Here, the inclination angle θ is needed to be set to avoid the engagement from being released taking the frictional force during the engagement with the first teeth 6a of the fixing-side rack 6 into consideration. The upper surface 7b may be inclined upward in the inclination angle θ in the height direction. Also, the upper surface 7b may be parallel to the horizontal direction, in a case where the inclination angle θ is 0°.

There are the inclined surface 7d, which is a continuous surface to the upper surface 7b, and the vertical surface 7e, which connects the inclined surface 7d and the lower surface 7c, on the tip of the second tooth 7a. The inclined surface 7d is inclined downward in the inclination angle β in the height direction relative to the horizontal direction. It is preferable that the inclination angle β is set in a range of 30° to 55°. The vertical surface 7e is formed in parallel with the height direction. It is preferable that the height dimension L of the vertical surface 7e is set 1 mm or more.

Furthermore, the first teeth 6*a* of the fixing-side rack 6 are formed in a substantially the same dimension and shape as those of the second teeth 7*a* so as to match with the second teeth 7*a* to be able to engage with the second teeth 7*a*.

Figure 5:
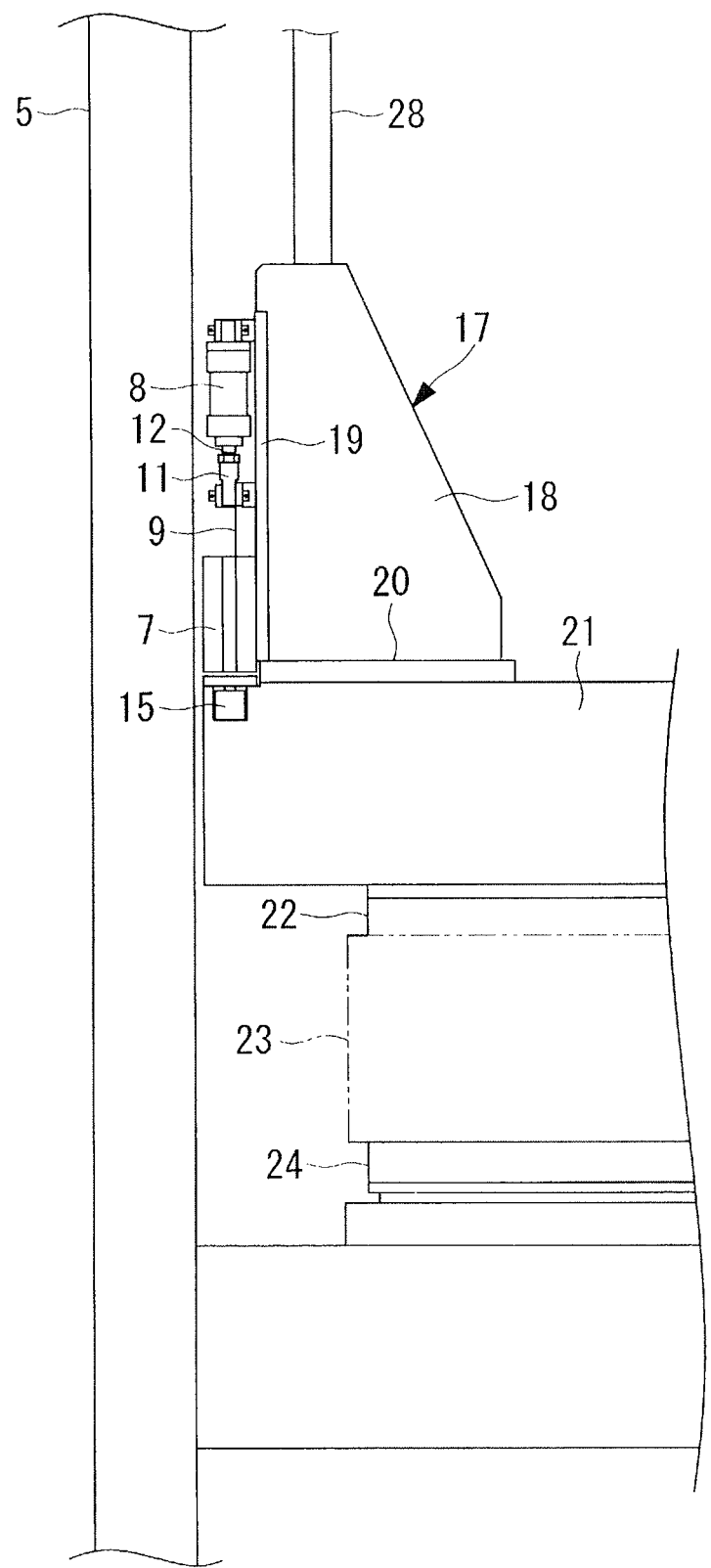
FIG. 5 is a cross-sectional view in C-C plane in FIG. 2 and indicates an enlarged view of a peripheral area of the pressure retaining part of the tire vulcanizing apparatus related to the first embodiment of the present embodiment.

The bracket 17 is a part that is provided above the upper mold attaching part 21 as shown in FIG. 5. The bracket 17 includes: the board part 19, which is provided to stand in the height direction relative to the upper mold attaching part 21; the board part 20, which is provided to the upper surface of the upper mold attaching part 21; and the board part 18, which is connected to both of the board part 19 and the board part 20, as shown in FIGS. 2 and 5.

The cylinder 8 is fixed to the board part 19 of the bracket 17 with the fixing part 13 (see FIG. 7) as shown in FIG. 5. The movable-side rack 7 is connected to the cylinder 8 through the link 10, the board part 9, the connecting part 11, and the rod 12, as shown in FIGS. 5 and 7.

Thus, the movable-side rack 7 is connected to the upper mold attaching part 21 through the bracket 17.

Figure 7:
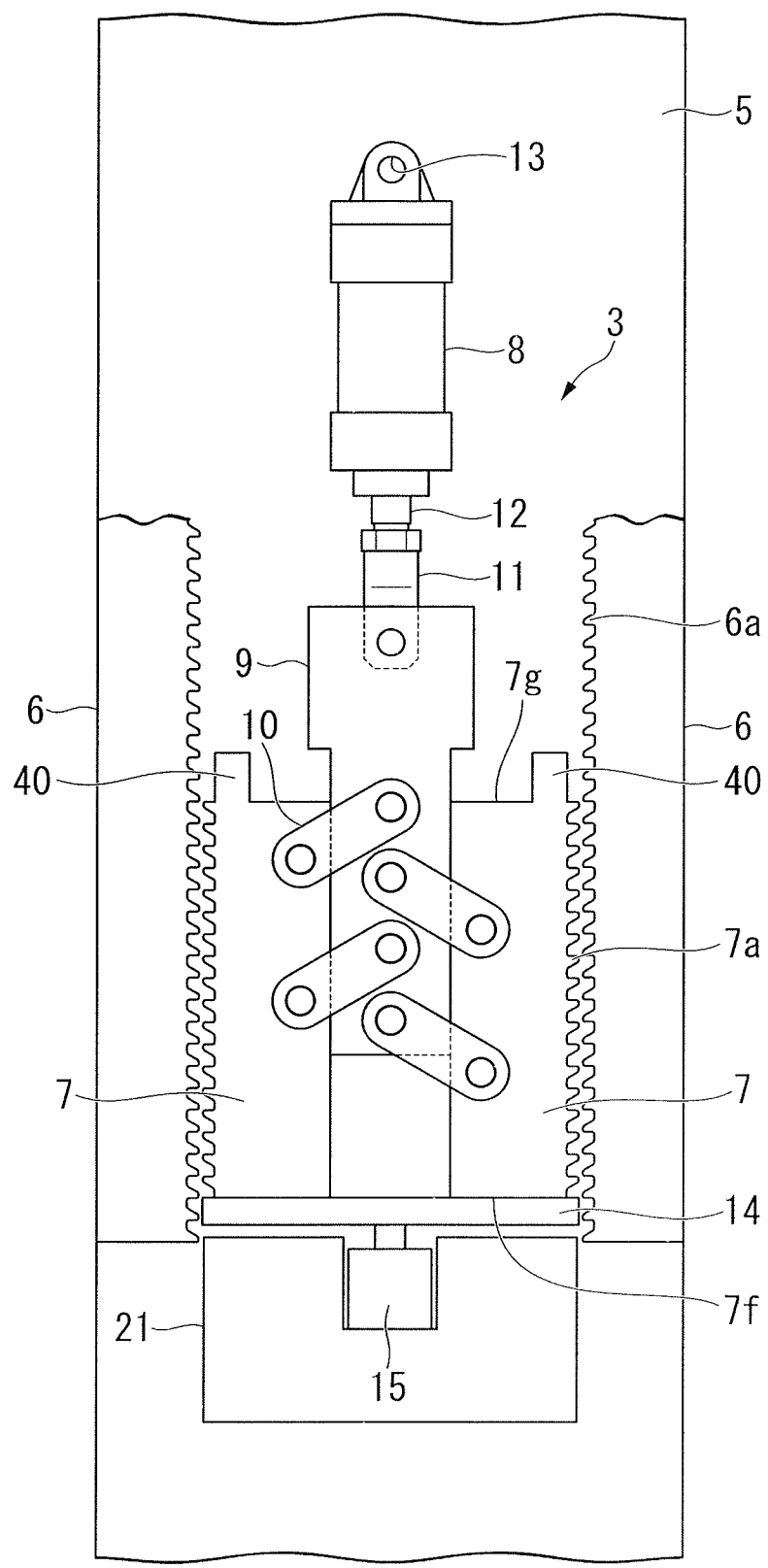
FIG. 7 is an arrow view along the direction E in FIG. 2 and indicates an enlarged view of a peripheral area of the pressure retaining part of the tire vulcanizing apparatus related to the first embodiment of the present embodiment.
Figure 8:
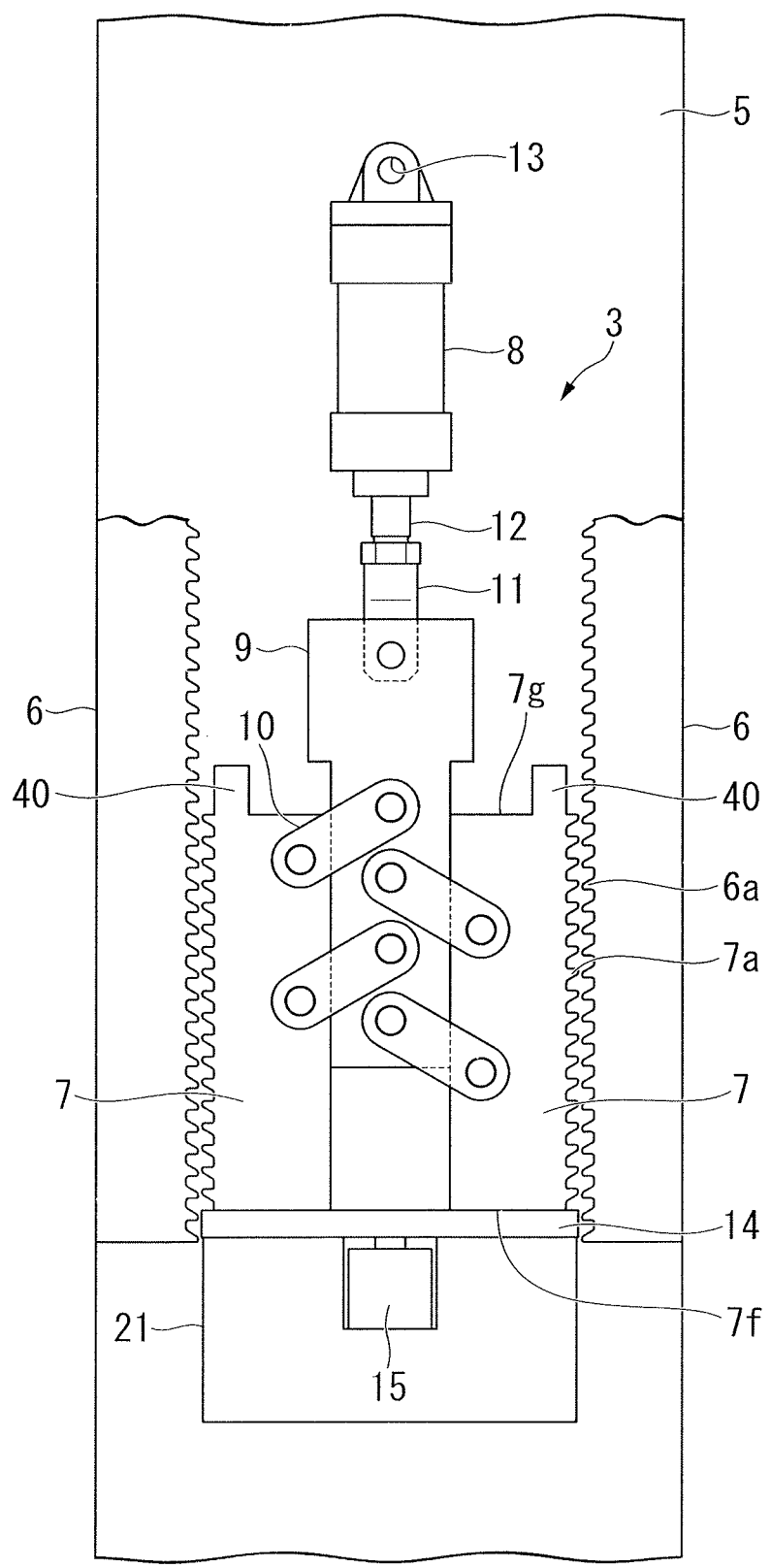
FIG. 8 is an arrow view along the direction E in FIG. 2 and indicates an enlarged view of a peripheral area of the pressure retaining part of the tire vulcanizing apparatus related to the first embodiment of the present embodiment.
Figure 9:
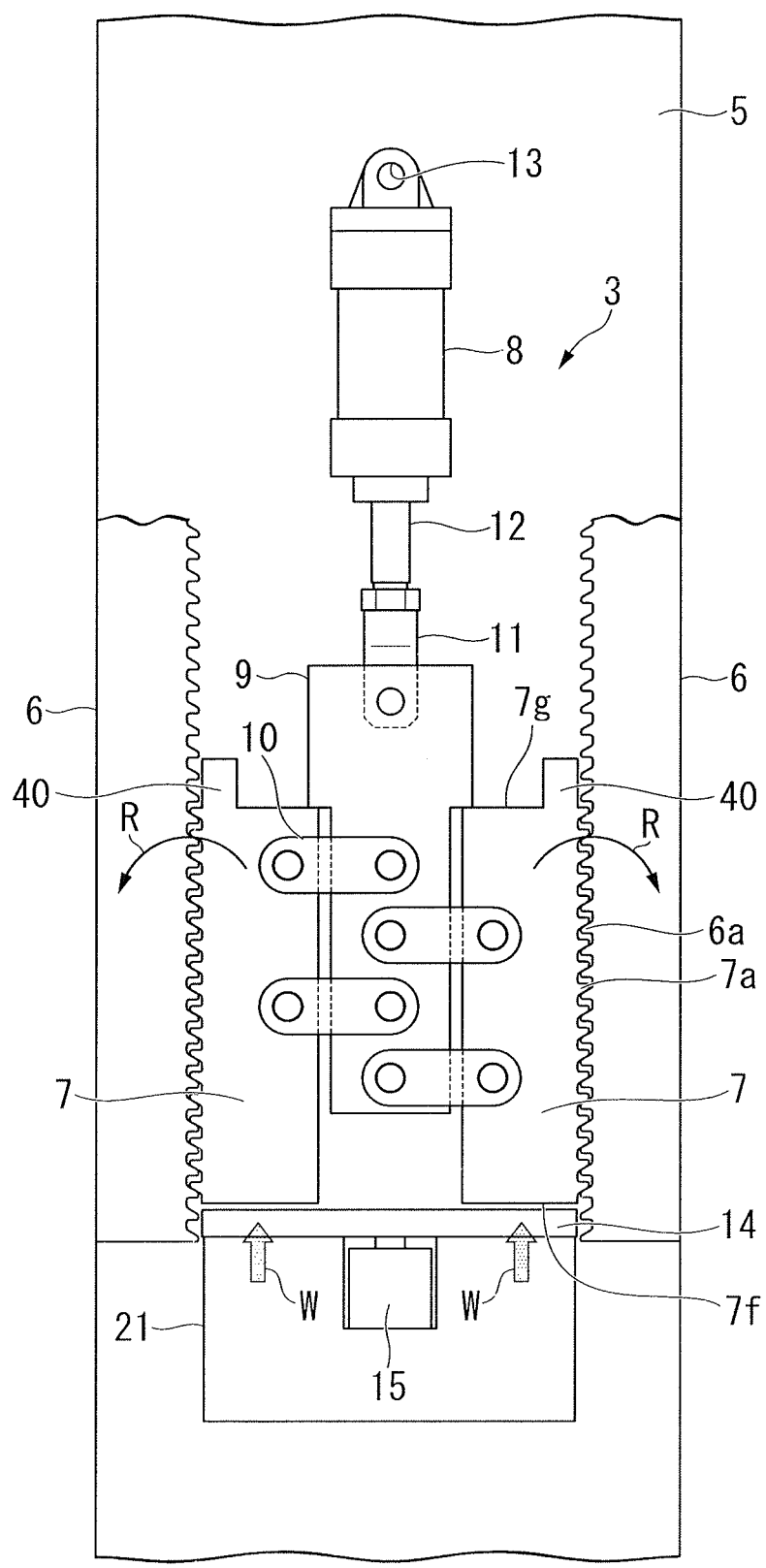
FIG. 9 is an arrow view along the direction E in FIG. 2 and indicates an enlarged view of a peripheral area of the pressure retaining part of the tire vulcanizing apparatus related to the first embodiment of the present embodiment.

The movable-side rack 7 is capable of moving in the horizontal direction relative to the fixing-side rack 6 because of the vertical movement of the board part 9 by driving the cylinder 8 as shown in FIGS. 7 to 9. The movable-side rack 7 can be engaged or disengaged with the fix side rack 6 by the horizontal movement of the movable-side rack 7.

Here, the upper mold attaching part 21 is fixed to the guide frame 5 when the both of the fixing-side rack 6 and the movable-side rack 7 engage each other. Contrary to that, the fixation of the upper mold attaching part 21 to the guide frame 5 is released when the fixing-side rack 6 and the movable-side rack 7 are disengaged, allowing vertical (the height direction of the mold 23) movement of the upper mold attaching part 21 relative to the guide frame 5 by the movement of the lifting cylinder 29.

The height of the upper mold attaching part 21 can be adjusted at any height in the range where the fixing-side rack 6 and the movable-side rack 7 are able to engage, since the first teeth 6*a* and the second teeth 7*a* are arrayed in the height direction on the fixed side rack 6 and the movable-side rack 7, respectively, as shown in FIGS. 3 and 4.

The height adjusting part 14 is a part in a plate shape provided below the bottom end surface 7*f* of the movable-side rack 7.

The cylinder 15 is provided to the upper mold attaching part 21 and supports the height adjusting part 14, allowing the height adjusting part 14 to be moved in the height direction with the movable-side rack 7.

Next, the tilting restriction part 40 is explained.

The tilting restriction part 40 is a part provided to the movable-side rack 7 to protrude from the top end surface 7*g* of the movable-side rack 7. The tilting restriction part 40 contacts with one or more of the tips of the first teeth 6*a* of the fixed side rack 6 when the movable-side rack 7 and the fixed side rack 6 engage each other in a state where the movable-side rack 7 and the fixed side rack 6 are in line with the height direction (in this embodiment, three tips of the first teeth 6*a*).

In the tire vulcanizing apparatus 1 configured as described above, the un-vulcanized tire 32 is placed between the upper mold 4 and the lower mold 35 as in the tire vulcanizer 2A as shown in the right side of FIG. 1. Then, the upper mold 4 is moved downward by the lifting cylinder 29, sandwiching the un-vulcanized tire 32 between the upper mold 4 and the lower mold 35 as in the tire vulcanizer 2B as shown in the left side of FIG. 1.

High-pressure, high-temperature steam or the like is introduced in the bladder 27 in this state. The high-pressure, high-temperature steam or the like presses and heats the un-vulcanized tire 32 from inside through the bladder 27 to push the un-vulcanized tire 32 to the mold 23. In this way, the vulcanizing treatment is performed on the un-vulcanized tire to produce the vulcanized tire 33.

The mold 23 is pushed to be opened in the height direction by the pressure reaction force provided by the bladder 27 during the vulcanizing treatment of the un-vulcanized tire 32 as shown in FIG. 9. Thus, the pressure reaction force W is subjected to the lower mold attaching part 26 and the upper mold attaching part 21 through the lower mold 35 and the upper mold 4, respectively.

Resisting to the pressure reaction force W, the movement of the movable-side rack 7 in the height direction is stopped by having the fixed side rack 6 and the movable-side rack 7 to be engaged each other in the pressure retaining part 3. As such, the upper mold 4 can be held in a predetermined height in the height direction through the upper mold attaching part 21.

Here, actions during engagement between the fixed side rack 6 and the movable-side rack 7 are explained.

FIG. 7 indicates a state before the engagement between the fixed side rack 6 and the movable-side rack 7. In this state, the upper mold attaching part 21 is capable of moving relative to the guide frame 5. In this situation, the rod 12 is houses in the cylinder 8, and the connecting part 11 and the board part 9 are located to the side of the cylinder 8.

The links 10 provided to the board part 9 are inclined to the height direction of the mold 23. The movable-side rack 7 is separated from the fixed side rack 6.

After the suitable height of the upper mold attaching part 21 is determined in consideration with the size of the mold 23, the movable-side rack 7 is moved toward the fixed side rack 6 to engage with the fixed side rack 6. Then, the vulcanizing treatment is initiated.

Here, if the tips of the first teeth 6*a* of the fixing-side rack 6 and the second teeth 7*a* of the movable-side rack 7 interfere each other after the movement of the movable-side rack 7 toward the fixed side rack 6 from the state shown in FIG. 7, the height of the height adjusting part 14 is adjusted by moving the cylinder 15 keeping the location of the upper mold attaching part 21 being fixed.

The height adjusting part 14 is moved toward the upper mold attaching part 21 keeping the movable-side rack 7 being separated from the fixed side rack 6 as shown in FIG. 8.

Then, the movable-side rack 7 is moved toward the fixed side rack 6 to engage with the fixed side rack 6 after the tips of the first teeth 6*a* and the second teeth 7*a* being positioned so as not to interfere each other as shown in FIG. 9.

The movable-side rack 7 is moved toward the fixed side rack 6 by having the links 10 provided to the board part 9 directed perpendicular to the height direction of the mold 23. As such, the movable-side rack 7 engages with the fixed side rack 6, and the upper mold attaching part 21 is fixed to the guide frame 5. In this situation, the rod 12 is pushed out from the cylinder 8, and the connecting part 11 and the board part 9 are separated away from the cylinder 8.

When the vulcanizing treatment starts, the inside of the mold 23 is pressurized. Thus, the pressure cylinder 25 pushes down the mold 23 to prevent it from opened up. In this situation, the gaps between the movable-side rack 7 and the fixed side rack 6 are closed. The gaps formed above and below the height adjusting part 14 are also closed. Consequently, the reaction force from the mold 23 is transmitted through the upper mold attaching part 21, the height adjusting part 14, the movable-side rack 7, the fixed side rack 6, and the guide frame 5 in order. Thus, the pressure reaction force W is sufficiently transmitted to the guide frame 5 by the engagement between the movable-side rack 7 and the fixed side rack 6 without involvement of the cylinder 8 or the cylinder 15. Thus, the pressing force can be retained, and the upper mold 4 can be retained at the predetermined height direction position.

In a case where the inclination angle α of the lower surface 7c of the second teeth 7a is inclined upward in the height direction relative to the horizontal direction, preferably in the range of 30° to 55°, and the pitch P is not changed during the engagement of the movable-side rack 7 and the fixed side rack 6, the thickness dimension at the bottom of the teeth can be set at a high value, improving the strength of the second teeth 7a.

Furthermore, when they engage with the first teeth 6a, the lower surface 7c of the second teeth 7a slides over the upper surface of the first tooth 6a, allowing secure engagement between them.

Also, in a case where the inclination angle θ of the upper surface 7b of the second teeth 7a is inclined downward in the height direction relative to the horizontal direction, and the pitch P is not changed, by having the thickness dimension at the bottom of the teeth set at a high value, the strength of the second teeth 7a can be improved. Further, machining of the parts can be simplified.

Also, because of the inclination angle β of the inclined surface 7d of the second teeth 7a, the upper surface 7b of the second teeth 7a slide under the lower surface of the first teeth 6a, allowing secure engagement between them.

Further, the height direction positions where the movable-side racks 7 engage with the fixed side racks 6 are kept the same position between the corresponding movable-side racks 7. In other words, miss engagement can be avoided.

Also, strength of the first teeth 6a can be improved by increasing the thickness dimension at the bottom of the teeth, and machining the part can be simplified as explained above, since they have identical dimensional shape to the second teeth 7a.

The pressure reaction force W is transmitted to the movable-side rack 7 through the lower mold attaching part 21 and the height adjusting part 14 during the vulcanizing treatment. In this situation, the pressure reaction force W is received by the movable-side rack 7 having the entire bottom end surface 7f of the movable-side rack 7 contacted with the height adjusting part 14. Therefore, the point of effort of the pressure reaction force W is positioned in the middle of the bottom end surface 7f of the movable-side rack 7 in the horizontal direction, generating inclination moment to the movable-side rack 7 relative to the height direction.

In more detail, the moment rotating the movable-side rack 7 in the rotation direction R is generated as shown in FIG. 9 by the pressure reaction force W, which is subjected upward at the point of effort on the bottom end surface 7f of the movable-side rack 7.

Therefore, the teeth located at the upper part among the second teeth 7a move closer to the bottom of the first teeth 6a horizontally, while the teeth located at the lower part among the second teeth 7a move away from the first teeth 6a horizontally. In other words, the movable-side rack 7 and the fixed side rack 6 are not engaged each other at the originally designed positions.

However, the tilting restriction part 40 is provided at the top end surface 7g of the movable-side rack 7 in the present embodiment, and the tilting restriction part 40 contacts with the tips of the first teeth 6a of the fixed side rack 6 when the movable-side rack 7 and the fixed side rack 6 engage each other in a state where the movable-side rack 7 and the fixed side rack 6 are in line with the height direction during the vulcanizing treatment. Thus, tilt of the movable-side rack 7 is restricted by the tilting restriction part 40 even if the moment due to the pressure reaction force W is generated to the movable-side rack 7. That is, the horizontal movement of the second teeth 7a closing to the first teeth 6a can be suppressed at the upper part of the movable-side rack 7 by reducing the moment.

Further, the engagement positions between the first teeth 6a and the second teeth 7a can be restricted by the tilting restriction part 40 configured as described above. In other words, contacting between a tip and a bottom of the tooth among the first teeth 6a and the second teeth 7a can be prevented. Also, too much separation between the tip and the bottom of the tooth can be restricted, preventing the moment arm from being long.

According to the tire vulcanizing apparatus 1 of the present embodiment, tilt of the movable-side rack 7 relative to the height direction can be restricted during performing the vulcanizing treatment. Also, the engagement positions between the fixed side rack 6 and the movable-side rack 7 can be restricted. Therefore, the bending moment subjected to the first teeth 6a of the fixed side rack 6 and the second teeth 7a of the movable-side rack 7 can be reduced. Consequently, the stress force generated in the first teeth 6a and the second teeth 7b can be reduced, allowing the damaging of the teeth to be prevented.

Next, the tire vulcanizing apparatus 2B related to the second embodiment of the present invention is explained.

Here, the identical reference numbers are given to the constituent components same as the first embodiment, and detail explanation for them are omitted.

In this embodiment, the tilting restriction part 50 is different from the tilting restriction part 40 of the first embodiment.

Figure 11A:
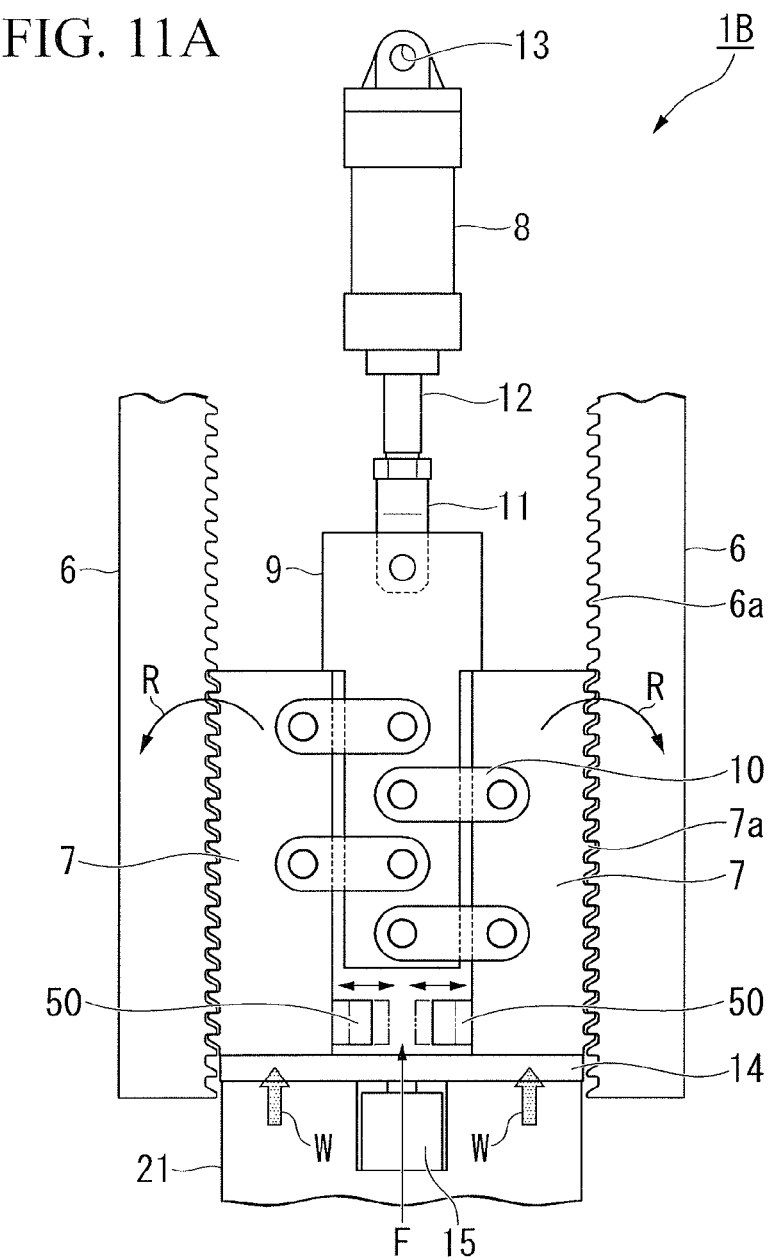
FIG. 11A is an enlarged front view of the pressure retaining part of the tire vulcanizing apparatus related to the second embodiment of the present invention.
Figure 11B:
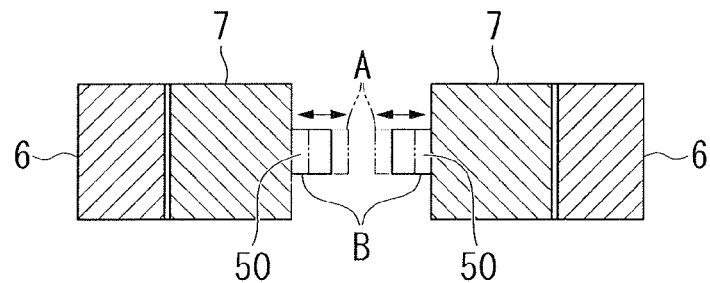
FIG. 11B is an arrow view along the direction F in FIG. 11A and indicates an enlarged view of the pressure retaining part of the tire vulcanizing apparatus related to the second embodiment of the present invention.

The tilting restriction parts 50 are parts that support each of the movable-side racks 7 on the inside of them horizontally and at the lower part of a surface facing the opposite side of the fixing-side racks 6 as shown in FIGS. 11A and 11B.

Then, an actuator that is not shown in the drawings is driven when the fixed side rack 6 and the movable-side rack 7 are engaged by the cylinder 8 in response to the engagement during performing the vulcanizing treatment. That is, the tilting restriction part 50 changes its location from the retreated position A to the restricting position B by the actuator not shown as shown in FIG. 11B. Thus, the tilting restriction parts 50 contact with the movable-side racks 7 in the horizontal direction to support them. Contrary to that, the tilting restriction part 50 changes its position from the restricting position B to the retreated position A when the vulcanizing treatment is finished. Thus, the tilting restriction parts 50 are separated away from the movable-side racks 7 horizontally.

In the tire vulcanizing apparatus 1B configured as describe above, the pressure reaction force W is transmitted to the movable-side rack 7 through the lower mold attaching part 21 and the height adjusting part 14 during the vulcanizing treatment as in the first embodiment. Thus, the moment tilting the movable-side rack 7 relative to the height direction is generated. In this situation, the movable-side racks 7 are supported by the tilting restriction parts 50 in the horizontal direction, restricting the tilt. That is, the moment is reduced by the action of the tilting restriction part 50. Also, the horizontal direction location of the first teeth 6a and the second teeth 7a can be restricted by the tilting restriction part 50.

According to the tire vulcanizing apparatus 1B of the present embodiment, the tilt of the movable-side rack 7 relative to the height direction can be restricted by the tilting restriction part 50 during performing the vulcanizing treatment as in the first embodiment. Also, the horizontal direction locations of the first teeth 6a and the second teeth 7a can be restricted. Thus, the stress force can be reduced by the reduced bending moment subjected to the first teeth 6a and the second teeth 7a, allowing damaging of the first teeth 6a and the second teeth 7a to be prevented.

Next, the tire vulcanizing apparatus 1C related to the third embodiment of the present invention is explained.

Here, the identical reference numbers are given to the constituent components same as the first and the second embodiments, and detail explanation for them are omitted.

In this embodiment, the tilting restriction part 60 is different from the tilting restriction part 40 of the first embodiment and the tilting restriction part 50 of the second embodiment.

Figure 12A:
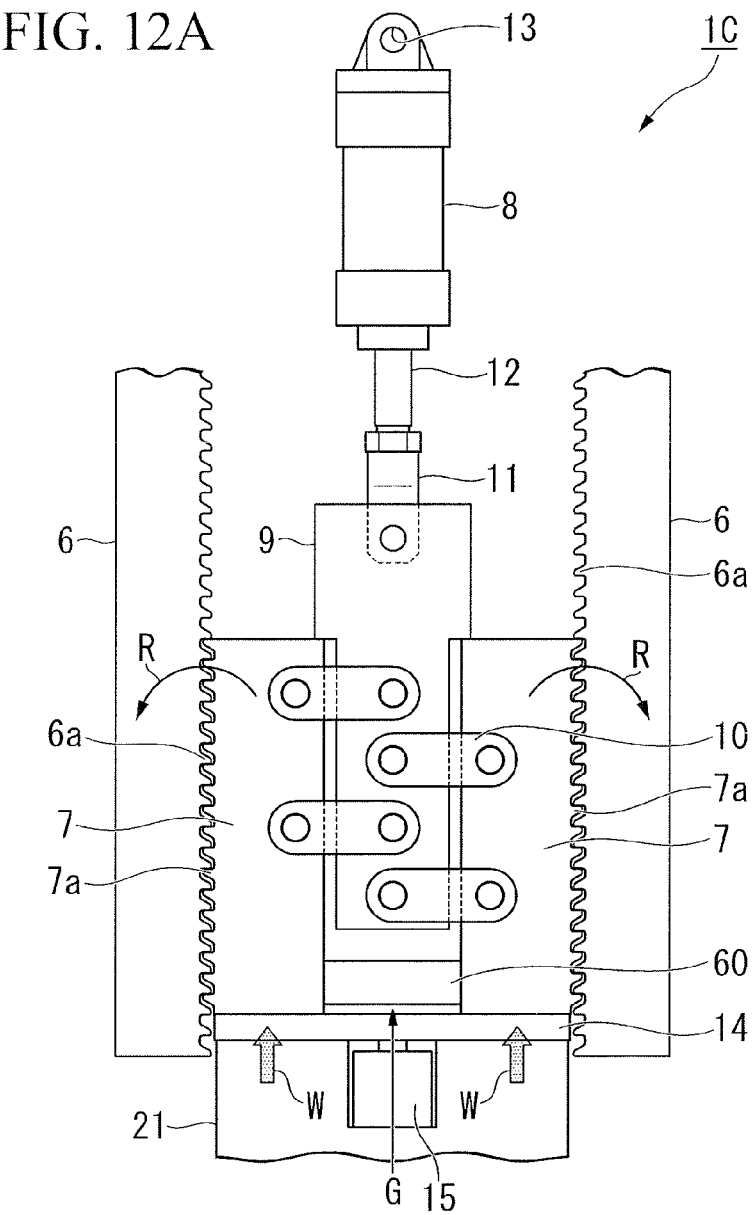
FIG. 12A is an enlarged front view of the pressure retaining part of the tire vulcanizing apparatus related to the third embodiment of the present invention.
Figure 12B:
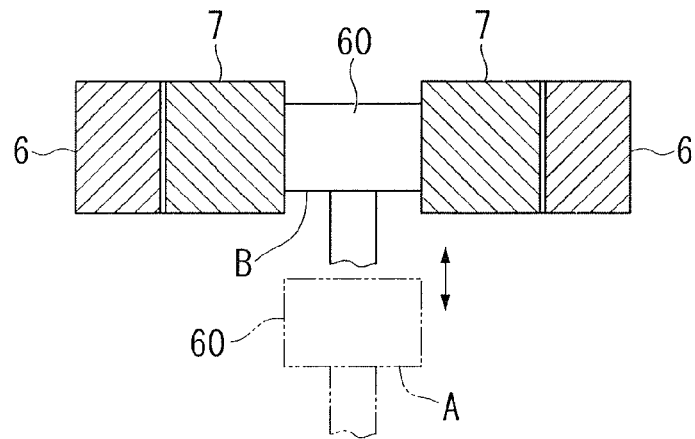
FIG. 12B is an arrow view along the direction G in FIG. 12A and indicates an enlarged view of the pressure retaining part of the tire vulcanizing apparatus related to the third embodiment of the present invention.

The tilting restriction part 60 is a rod-shaped part that is provided to push outwardly the two facing movable-side racks 7 between them as shown in FIGS. 12A and 12B.

Then, an actuator that is not shown in the drawings is driven when the fixed side rack 6 and the movable-side rack 7 are engaged by the cylinder 8 in response to the engagement during performing the vulcanizing treatment. That is, the tilting restriction part 60 changes its location from the retreated position A to the restricting position B by the actuator not shown as shown in FIG. 12B. Thus, the tilting restriction part 60 is place between the two facing movable-side racks 7 to support them horizontally. Contrary to that, the tilting restriction part 60 changes its position from the restricting position B to the retreated position A in such a way the tilting restriction part 60 to be withdrawn from the interspace between the facing movable-side racks 7 when the vulcanizing treatment is finished. Thus, the tilting restriction parts 60 are separated away from the movable-side racks 7.

In the tire vulcanizing apparatus 1C configured as described above, the moment tilting the movable-side rack 7 relative to the height direction is generated as in the first and the second embodiments. In this situation, the movable-side racks 7 are supported by the tilting restriction part 60 in the horizontal direction, restricting the tilt. That is, the moment is reduced by the action of the tilting restriction part 60. Also, the horizontal direction location of the first teeth 6a and the second teeth 7a can be restricted by the tilting restriction part 60.

According to the tire vulcanizing apparatus 1C of the present embodiment, the tilt of the movable-side rack 7 relative to the height direction can be restricted by the tilting restriction part 60 during performing the vulcanizing treatment as in the first and second embodiments. Also, the horizontal direction locations of the first teeth 6a and the second teeth 7a can be restricted. Thus, the stress force can be reduced by the reduced bending moment subjected to the first teeth 6a and the second teeth 7a, allowing damaging of the first teeth 6a and the second teeth 7a to be prevented.

Next, the tire vulcanizing apparatus 1D related to the fourth embodiment of the present invention is explained.

Here, the identical reference numbers are given to the constituent components same as the first, second, and third embodiments, and detail explanation for them are omitted.

In this embodiment, the tilting restriction part 70 is different from the tilting restriction parts 40, 50, and 60 of the first, second, and third embodiments.

Figure 13A:
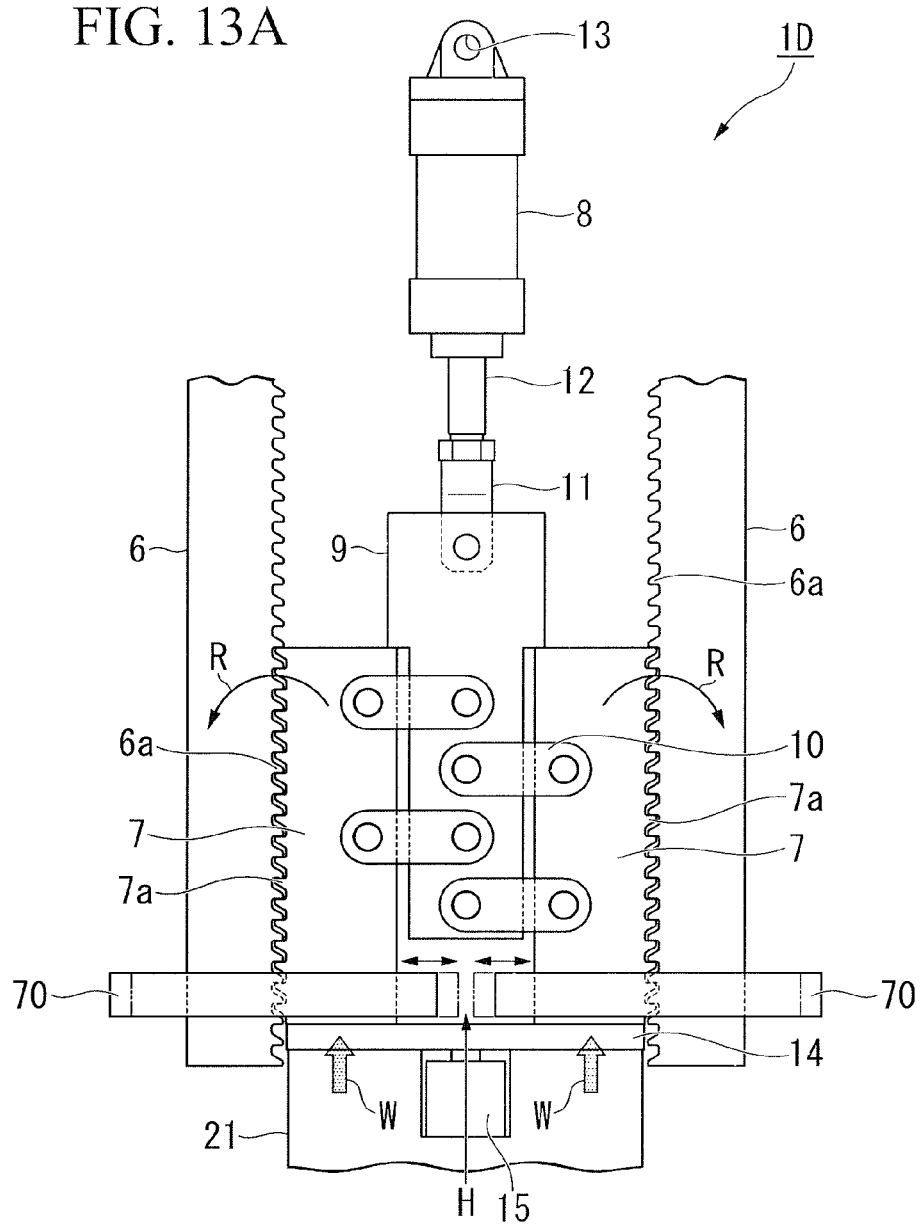
FIG. 13A is an enlarged front view of the pressure retaining part of the tire vulcanizing apparatus related to the fourth embodiment of the present invention.
Figure 13B:
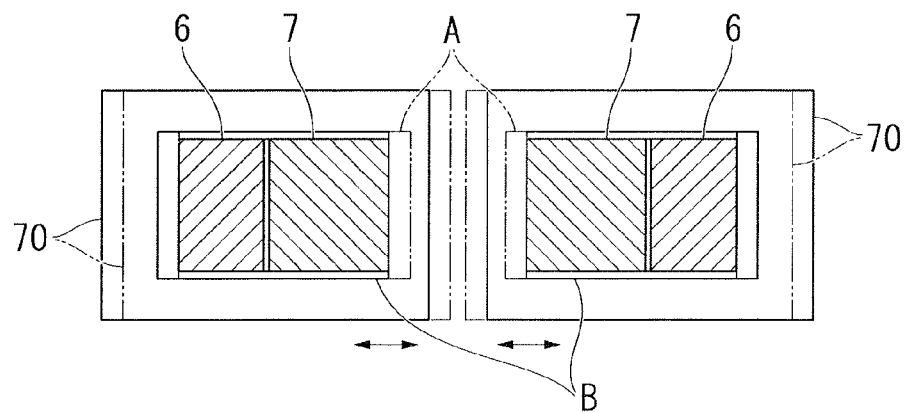
FIG. 13B is an arrow view along the direction H in FIG. 13A and indicates an enlarged view of the pressure retaining part of the tire vulcanizing apparatus related to the fourth embodiment of the present invention.

The tilting restriction part 70 is a part that supports the engaged fixed side rack 6 and the movable-side rack 7 holding them from their outer peripheral to prevent them from being separated as shown in the FIGS. 13A and 13B.

Then, an actuator that is not shown in the drawings is driven when the fixed side rack 6 and the movable-side rack 7 are engaged by the cylinder 8 in response to the engagement during performing the vulcanizing treatment. That is, the tilting restriction part 70 changes its location from the retreated position A to the restricting position B by the actuator not shown as shown in FIG. 13B. Thus, the tilting restriction part 70 supports the movable-side rack 7 in the horizontal direction by contacting to it. Contrary to that, the tilting restriction part 70 is separated away from the movable-side racks 7 when the vulcanizing treatment is finished.

In the tire vulcanizing apparatus 1D configured as described above, the moment tilting the movable-side rack 7 relative to the height direction is generated during the vulcanizing treatment as in the first to the third embodiments. In this situation, the tilt of the movable-side rack 7 toward the fixed side rack 6 is restricted by holding the engaged fixed side rack 6 and the movable-side rack 7 at their outer peripheral with the tilting restriction part 70. Here, the fixed side rack 6 is tightly fixed on the guide frame 5. Thus, the movable-side rack 7 does not lean with the fixed side rack 6, meaning the moment is reduced by the action of the tilting restriction part 70. Also, the horizontal direction location of the first teeth 6a and the second teeth 7a can be restricted by the tilting restriction part 70.

According to the tire vulcanizing apparatus 1D of the present embodiment, the tilt of the movable-side rack 7 relative to the height direction can be restricted by the tilting restriction part 70 during performing the vulcanizing treatment as in the first to the third embodiments. Also, the horizontal direction locations of the first teeth 6a and the second teeth 7a can be restricted. Thus, the stress force can be reduced by the reduced bending moment subjected to the first teeth 6a and the second teeth 7a, allowing damaging of the first teeth 6a and the second teeth 7a to be prevented.

Next, the tire vulcanizing apparatus 1E related to the fifth embodiment of the present invention is explained.

Here, the identical reference numbers are given to the constituent components same as the first to the fourth embodiments, and detail explanation for them are omitted.

In this embodiment, the basic configuration is the same as the first embodiment, and only the shape of the bottom end 87f of the movable-side rack 87 differs from the first embodiment.

Figure 14:
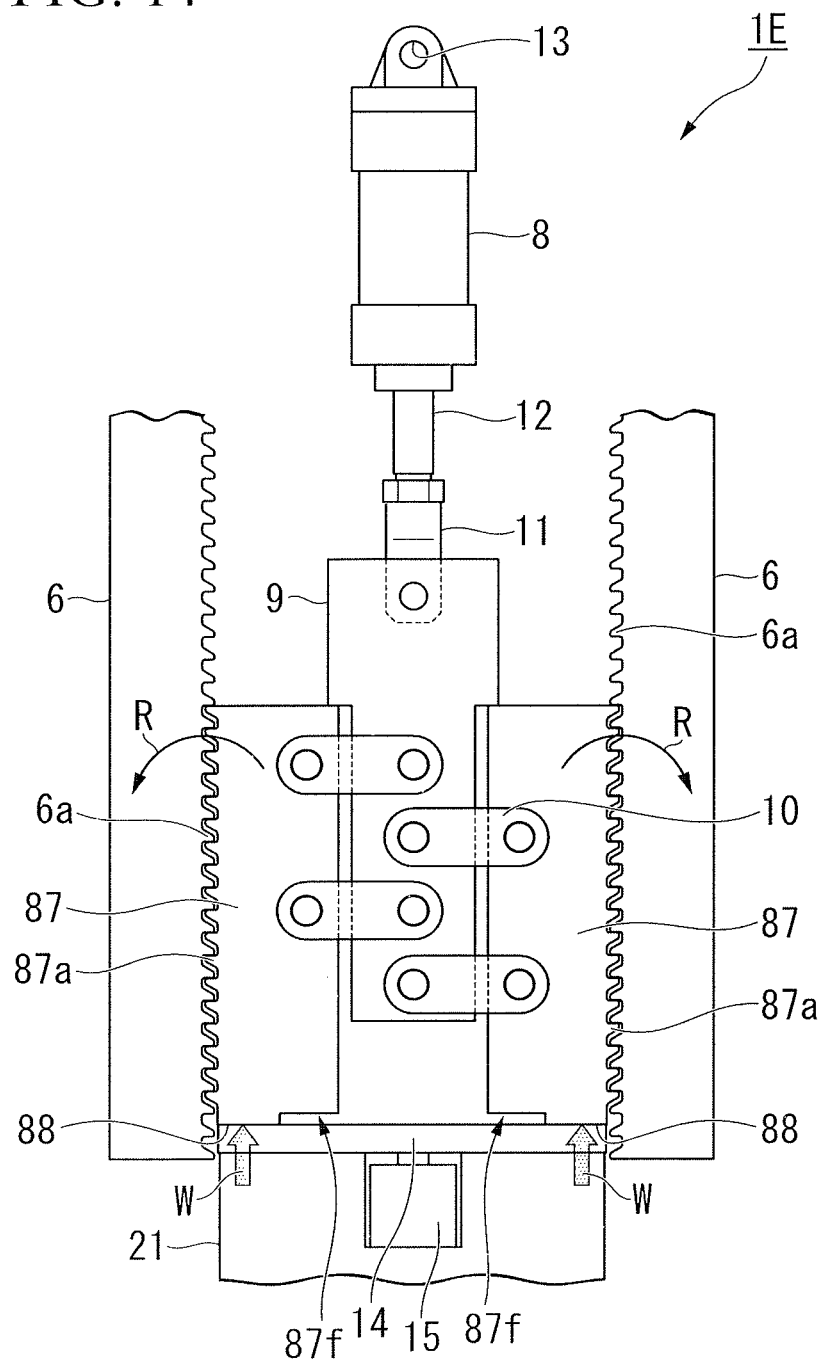
FIG. 14 is an enlarged from view of the pressure retaining part of the tire vulcanizing apparatus related to the fifth embodiment of the present invention.

The movable-side rack 87 includes the bottom end surface 87f as shown in FIG. 14. The bottom end surface 87f includes the lower contacting surface 88 that is formed to protrude downward at the side of the fixed side rack 6, with which the movable-side rack 87 engages. In other words, the bottom end surface 87f is formed in a staircase pattern, and only the lower contacting surface 88 in the bottom end surface 87 contacts with the upper surface of the height adjusting part 14 to receive the pressure reaction force W.

Further, the lower contacting surface 88 is formed in such a way that the horizontal central part of the lower contacting surface 88, which is the point of effort of the pressure reaction force W, is positioned closer to the fixing-side rack 6 than the horizontal central part of the movable-side rack 87. Here, it is preferable that the lower contacting surface 88 is formed in such a way that the point of effort is positioned as close as possible to the fixing-side rack 6.

In the tire vulcanizing apparatus 1E configured as described above, the movable-side rack 97 receives the pressure reaction force W from the lower part during the vulcanizing treatment. Then, the pressure reaction force W is placed on the entire surface of the lower contacting surface 88 of the bottom end surface 87f. Here, the point of effort of the pressure reaction force W on the lower contacting surface 88 is located at a position closer to the fixed side rack 6 horizontally. Thus, comparing to a case where there is no lower contacting surface 88 formed and the bottom end surface 87f of the movable-side rack 87 is a horizontally flat surface, it is possible to shorten the moment arm between the first and second teeth 6a, 87a, which are the point of action of the pressure reaction force W, and the point of effort.

According to the tire vulcanizing apparatus 1E of the present embodiment, the above-described moment arm can be shortened and the moment can be reduced by the lower contacting surface 88 of the movable-side rack 87 during performing the vulcanizing treatment. Thus, the stress force generated in the first teeth 6a and the second teeth 87a can be reduced, and damaging of them can be suppressed.

In addition, the movable-side rack 87 of the present embodiment can be installed to the tire vulcanizers 1B, 1C, and 1D explained in the second to fourth embodiments.

Next, the tire vulcanizing apparatus 1F related to the sixth embodiment of the present invention is explained.

Here, the identical reference numbers are given to the constituent components same as the first to the fifth embodiments, and detail explanation for them are omitted.

In this embodiment, the basic configuration is the same as the first embodiment, and only the position that the movable-side rack 97 receives the pressure reaction force W differs from the first embodiment.

Figure 15A:
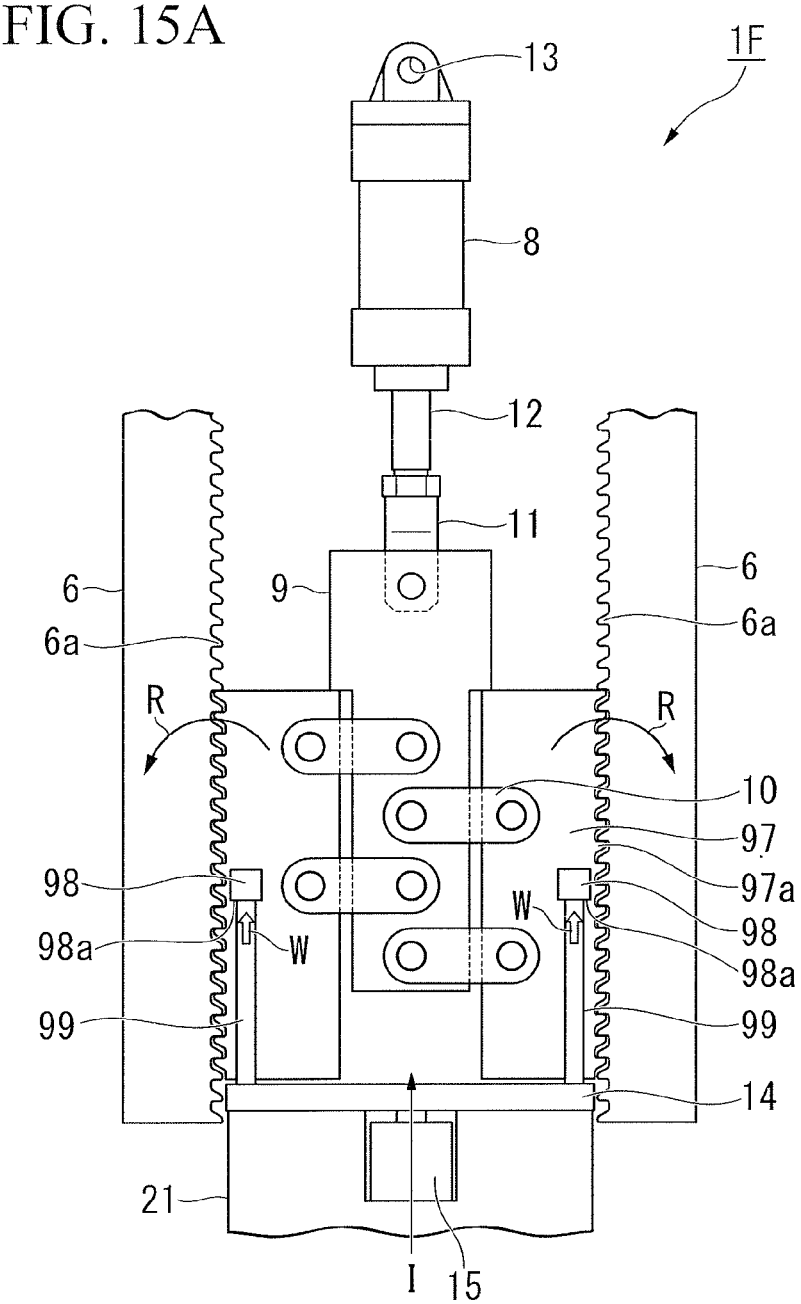
FIG. 15A is an enlarged front view of the pressure retaining part of the tire vulcanizing apparatus related to the sixth embodiment of the present invention.
Figure 15B:
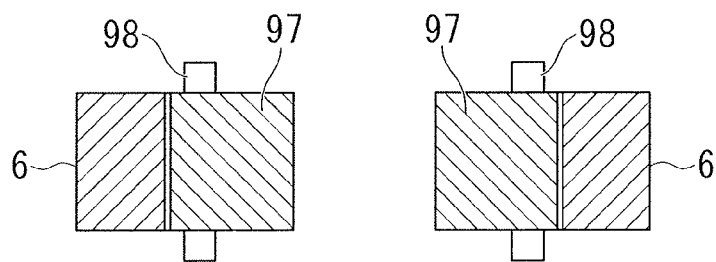
FIG. 15B is an arrow view along the direction I in FIG. 15A and indicates an enlarged view of the pressure retaining part of the tire vulcanizing apparatus related to the sixth embodiment of the present invention.

The movable-side rack 97 includes the protruding parts 98, which are provided at the substantially central parts of the movable-side rack 97 in the height direction on the side of the fixed side rack 6, as shown in FIGS. 15A and 15B. The protruding parts 98 protrude from the both surfaces facing the depth direction (the depth direction on the sheets of FIGS. 15A and 15B) perpendicular to the height direction.

The protruding parts 98 are provided to receive the pressure reaction force W from the height adjusting part 14 at the lower surfaces 98a. Specifically, the force transmitting parts 99 are provided between the lower surfaces 98a of the protruding parts 98 and the height adjusting part 14 in a state where a space is kept between the height adjusting part 14 and the movable-side rack 97. The pressure reaction force W from the height adjusting part 14 is transmitted to the lower surfaces 98a of the protruding parts 98 by the force transmitting parts 99. Thus, the pressure reaction force W is received by the lower surfaces 98a.

The lower surfaces 98a of the protruding parts 98 are formed in such a way that the horizontal central parts of the lower surfaces 98a of the protruding parts 98, which are the point of effort of the pressure reaction force W, are positioned closer to the engaging fixing-side rack 6 than the horizontal central part of the corresponding movable-side rack 97. It is preferable that the protruding parts 98 are formed in such a way that the point of effort is positioned as close as possible to the fixing-side rack 6.

In the tire vulcanizing apparatus 1F configured as described above, the movable-side rack 97 receives the pressure reaction force W from below during the vulcanizing treatment. Then, the pressure reaction force W is placed on the entire lower surface 98a of the protruding part 98. Here, the point of effort of the pressure reaction force W on the lower surface 98a is located in a position closer to the fixed side rack 6 horizontally. Thus, it is possible to shorten the moment arm between the first and second teeth 6a, 97a, which are the point of action of the pressure reaction force W, and the point of effort as in the lower contacting surface 88 of the fifth embodiment.

According to the tire vulcanizing apparatus 1F of the present embodiment, the above-described moment arm can be shortened and the bending moment can be reduced by the protruding part 98 of the movable-side rack 97 during performing the vulcanizing treatment. Thus, the stress force generated in engagement between the first teeth 6a and the second teeth 97a can be reduced, and damaging of them can be suppressed.

The shape of the protruding part 98 is not limited to the rectangular shape in the horizontal cross section, as long as the protruding part 98 is capable of receiving the pressure reaction force W.

The protruding parts 98 are provided at the substantially central parts of the movable-side rack 97 in the height direction. However, the position that the protruding part 98 is provided in is not particularly limited as long as the protruding part 98 does not interfere with other components of the tire vulcanizing apparatus 1F.

In addition, the movable-side rack 97 of the present embodiment can be installed to the tire vulcanizers 1B, 1C, and 1D explained in the second to fourth embodiments.

Next, the tire vulcanizing apparatus 1G related to the seventh embodiment of the present invention is explained.

Here, the identical reference numbers are given to the constituent components same as the first to the sixth embodiments, and detail explanation for them are omitted.

In this embodiment, the basic configuration is the same as the first embodiment, and only the position that the movable-side rack 107 receives the pressure reaction force W differs from the first embodiment.

Figure 16A:
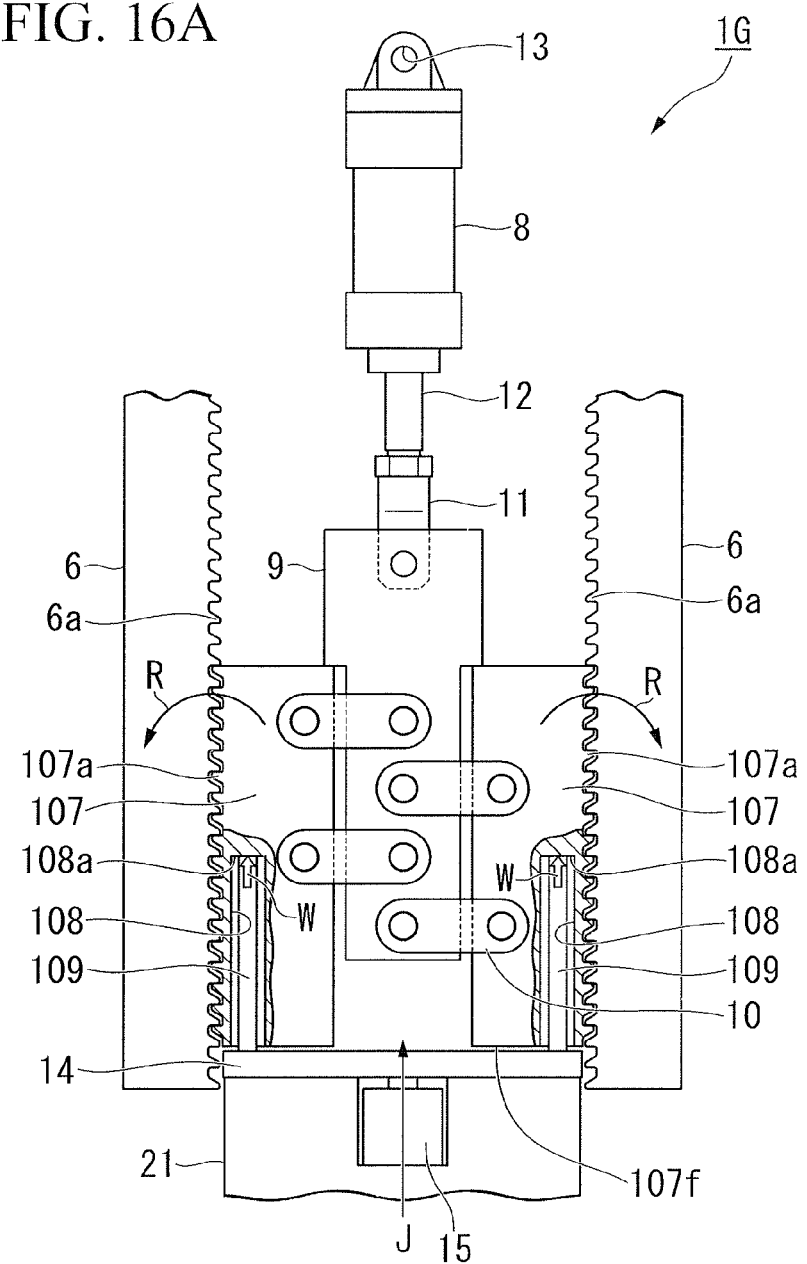
FIG. 16A is an enlarged front view of the pressure retaining part of the tire vulcanizing apparatus related to the seventh embodiment of the present invention.
Figure 16B:
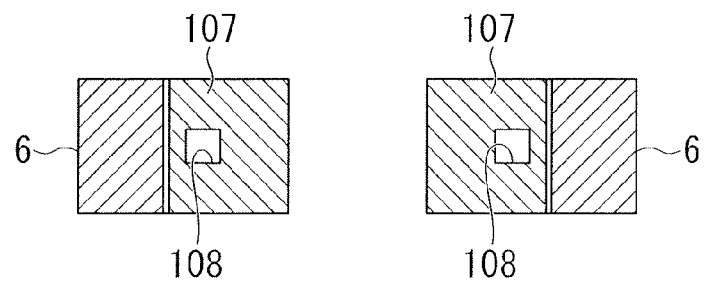
FIG. 16B is an arrow view along the direction J in FIG. 16A and indicates an enlarged view of the pressure retaining part of the tire vulcanizing apparatus related to the seventh embodiment of the present invention.

The movable-side rack 107 includes the recessed part 108, which is a recess provided through to the substantially central part of the movable-side rack 107 in the height direction from the bottom end surface 107f on the side of the fixed side rack 6, as shown in FIGS. 16A and 16B. The internal surface recessed part 108 is in a rectangular pillar shape.

The recessed part 108 receives the pressure reaction force W from the height adjusting part 14 on the upper bottom surface 108a of the recessed portion 108. That is, the pressure reaction force W is received by the internal part of the movable-side rack 107. Specifically, the force transmitting parts 109 are provided between the upper bottom surface 108a of the recessed part 108 and the height adjusting part 14 in a state where a space is kept between the height adjusting part 14 and the movable-side rack 107. The pressure reaction force W from the height adjusting part 14 is transmitted to the upper bottom surface 108a of the recessed part 108 by the force transmitting parts 109. Thus, the pressure reaction force W is received by the upper bottom surface 108a.

The upper bottom surface 108a of the recessed part 108 is formed in such a way that the horizontal central part of the upper bottom surface 108a of the recessed part 108, which is the point of effort of the pressure reaction force W, is positioned closer to the engaging fixing-side rack 6 than the horizontal central part of the corresponding movable-side rack 107. It is preferable that the recessed part 108 is formed in such a way that the point of effort is positioned as close as possible to the fixing-side rack 6.

In the tire vulcanizing apparatus 1G configured as described above, the movable-side rack 107 receives the pressure reaction force W from below during the vulcanizing treatment. Then, the pressure reaction force W is placed on the entire upper bottom surface 108a of the recessed part 108. Here, the point of effort of the pressure reaction force W on the upper bottom surface 108a is located in a position closer to the fixed side rack 6 horizontally. Thus, it is possible to shorten the moment arm between the first and second teeth 6a, 107a, which are the point of action of the pressure reaction force W, and the point of effort as in the lower contacting surface 88 of the fifth embodiment.

According to the tire vulcanizing apparatus 1G of the present embodiment, the above-described moment arm can be shortened and the moment can be reduced by the recessed part 108 of the movable-side rack 107 during performing the vulcanizing treatment. Thus, the stress force generated in engagement between the first teeth 6*a* and the second teeth 107*a* can be reduced, and damaging of them can be suppressed.

The shape of internal surface of the recessed part 108 is not limited to the rectangular pillar shape, as long as the recessed part 108 is capable of receiving the pressure reaction force W.

The recessed part 108 is provided through to the substantially central parts of the movable-side rack 107 in the height direction. However, it is not particularly limited to the configuration. The recessed part 108 can be formed through to any height as long as the recessed part 108 does not interfere with other components of the tire vulcanizing apparatus 1G and a sufficient mechanical strength of the movable-side rack 107 can be secured.

In addition, the movable-side rack 107 of the present embodiment can be installed to the tire vulcanizers 1B, 1C, and 1D explained in the second to fourth embodiments.

Next, the tire vulcanizing apparatus 1H related to the seventh embodiment of the present invention is explained.

Here, the identical reference numbers are given to the constituent components same as the first to the seventh embodiments, and detail explanation for them are omitted.

In this embodiment, the basic configuration is the same as the first embodiment, and only the position that the movable-side rack 117 receives the pressure reaction force W differs from the first embodiment.

Figure 17A:
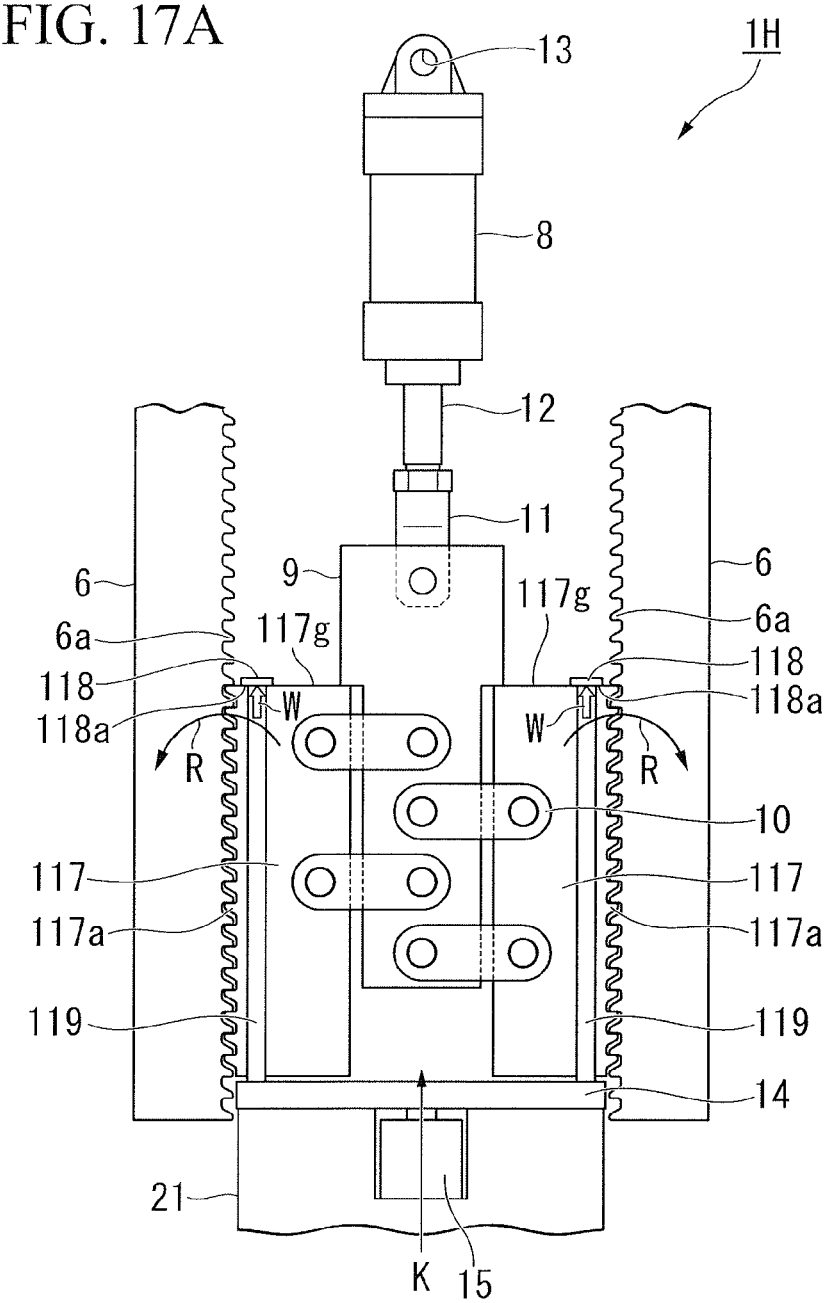
FIG. 17A is an enlarged front view of the pressure retaining part of the tire vulcanizing apparatus related to the eighth embodiment of the present invention.
Figure 17B:
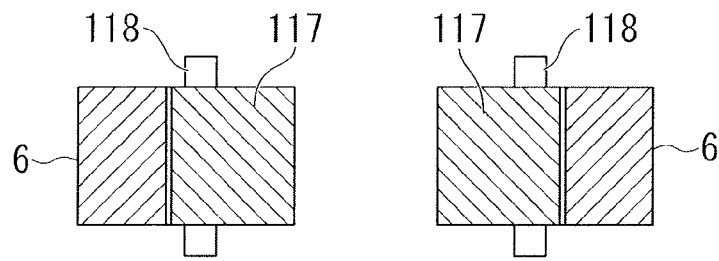
FIG. 17B is an arrow view along the direction K in FIG. 17A and indicates an enlarged view of the pressure retaining part of the tire vulcanizing apparatus related to the eighth embodiment of the present invention.

The movable-side rack 117 includes the upper part supporting parts 118 in a plate shape as shown in FIGS. 17A and 17B. The upper part supporting parts 118 are provided on the side of the fixed side rack 6 and protrude from the both surfaces facing the depth direction (the depth direction on the sheets of FIGS. 17A and 17B) perpendicular to the height direction.

The upper part supporting parts 118 are provided to receive the pressure reaction force W from the height adjusting part 14 at the lower surfaces 118*a*. Specifically, the force transmitting parts 119 are provided between the lower surfaces 118*a* of the upper support parts 118 and the height adjusting part 14 in a state where a space is kept between the height adjusting part 14 and the movable-side rack 117. The pressure reaction force W from the height adjusting part 14 is transmitted to the lower surfaces 118*a* of the upper part supporting parts 118 by the force transmitting parts 119. Thus, the pressure reaction force W is received by the lower surfaces 118*a*.

The lower surfaces 118*a* of the upper part supporting parts 118 are formed in such a way that the horizontal central parts of the lower surfaces 118*a* of the upper part supporting parts 118, which are the point of effort of the pressure reaction force W, are positioned closer to the engaging fixing-side rack 6 than the horizontal central part of the corresponding movable-side rack 117. It is preferable that the upper part supporting parts 118 are formed in such a way that the point of effort is positioned as close as possible to the fixing-side rack 6.

In the tire vulcanizing apparatus 1H configured as described above, the movable-side rack 117 receives the pressure reaction force W from below during the vulcanizing treatment. Then, the pressure reaction force W is placed on the entire lower surface 118*a* of the upper part supporting parts 118. Here, the point of effort of the pressure reaction force W on the lower surface 118*a* is located in a position closer to the fixed side rack 6 horizontally. Thus, it is possible to shorten the moment arm between the first and second teeth 6*a*, 117*a*, which are the point of action of the pressure reaction force W, and the point of effort as in the lower contacting surface 88 of the fifth embodiment.

According to the tire vulcanizing apparatus 1H of the present embodiment, the above-described moment arm can be shortened and the bending moment can be reduced by the upper part supporting parts 118 of the movable-side rack 117 during performing the vulcanizing treatment. Thus, the stress force generated in engagement between the first teeth 6*a* and the second teeth 117*a* can be reduced, and damaging of them can be suppressed.

The shape of the upper part supporting part 118 is not limited to the plate shape, as long as it is capable of receiving the pressure reaction force W.

In addition, the movable-side rack 117 of the present embodiment can be installed to the tire vulcanizers 1B, 1C, and 1D explained in the second to fourth embodiments.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, more than one of the tilting restriction parts 40, 50, 60, and 70 of each embodiment can be provided at the same time.

In addition, the link 10 of the pressure retaining part 3 can be a part having strength sufficient to prevent tilting during action of the bending moment on the movable-side racks 7, 87, 97, 107, and 117 in the above-described embodiments. In this case, the link 10 can be used as a tilting restriction part.

The movable-side racks 7, 87, 97, 107, and 117 are provided to the upper mold attaching part 21 in the above-described embodiments. However, the configurations can be applied to a tire vulcanizing apparatus, in which the lower mold 35 is movable in the height direction, by providing the movable-side racks to the lower mold attaching part 26.

The movable-side racks 7, 87, 97, 107, and 117 are provided to the upper part of the upper mold attaching part 21 in the above-described embodiments. However, the location that the movable-side racks are provided can be anywhere on the upper mold attaching part 21, such as the lower part, the side part, or the like. Also, the movable-side racks can be attached to the upper mold attaching part 21 on its upper surface, lower surface, side surface, or the like directly without the bracket 17.

Also, the position that the fixed side rack 6 is provided is not limited to the above-described embodiments.

INDUSTRIAL APPLICABILITY

A tire vulcanizer is provided. By using the tire vulcanizer, the stress force during engagement of the teeth can be reduced and teeth damage can be suppressed, allowing down-sizing, light-weighting, and simplifying at the same time.

BRIEF DESCRIPTION OF THE REFERENCE SYMBOLS

1: Tire vulcanizing apparatus
2A: Tire vulcanizer
2B: Tire vulcanizer
3: Pressure retaining part
4: Upper mold (First mold)
5: Guide frame (Supporting part)

6: Fixing-side rack (First rack)
7: Movable-side rack (Second rack)
6a: First tooth
7a: Second tooth
7b: Upper surface
7c: Lower surface
7d: Inclined surface
7e: Vertical surface
7f: Bottom end surface
7g: Top end surface
8: Cylinder
9: Board part
10: Link
11: Connecting part
12: Rod
13: Fixing part
14: Height adjusting part
15: Cylinder
17: Bracket
18: Board part
19: Board part
20: Board part
21: Upper mold attaching part (First mold attaching part)
22: Upper platen
23: Mold
24: Lower platen
25: Pressure cylinder
26: Lower mold attaching part (Second mold attaching part)
27: Bladder
28: Cylinder rod
29: Lifting cylinder
30: Upper mold operating apparatus
31: Loader
32: Un-vulcanized tire
33: Vulcanized tire
34: Unloader
35: Lower mold (Second mold)
36: Rack fixing part
40: Tilting restriction part
W: Pressure reaction force
1B: Tire vulcanizing apparatus
50: Tilting restriction part
1C: Tire vulcanizing apparatus
60: Tilting restriction part
1D: Tire vulcanizing apparatus
70: Tilting restriction part
1E: Tire vulcanizing apparatus
87: Movable-side rack
87f: Bottom end surface
88: Lower contacting surface
99: Force transmitting part
1F: Tire vulcanizing apparatus
97: Movable-side rack
98: Protruding part
98a: Lower surface
1G: Tire vulcanizing apparatus
107: Movable-side rack
107f: Bottom end surface
108: Recessed part
108a: Upper bottom surface
109: Force transmitting part
1H: Tire vulcanizing apparatus
117: Movable-side rack
117g: Top end surface
118: Upper supporting part
118a: Lower surface

The invention claimed is:

1. A tire vulcanizer, comprising:
a first mold attaching part to which a first mold is attached;
a second mold attaching part to which a second mold pressed on the first mold is attached;
a supporting part configured to support the first mold attaching part and the second mold attaching part;
a first rack, which has a plurality of first teeth arranged in a pressing direction in which the first mold attaching part and the second mold attaching part are pressed on each other, the first rack being provided to the supporting part;
a second rack, which has a plurality of second teeth capable of engaging with the plurality of first teeth of the first rack, the second rack being provided to the first mold attaching part or the second mold attaching part; and
a tilting restriction part configured to restrict tilt of the second rack derived from the pressing direction,
wherein the tilting restriction part comprises a contacting part formed in a rectangular shape, wherein the contacting part is provided on a top end surface of the second rack located opposite to a bottom end surface of the second rack where a force received from the first mold attaching part or the second mold attaching part in the pressing direction is placed, and
in a state where the first teeth and the second teeth engage each other, a surface of the contacting part along the pressing direction is in contact with a tip of the first teeth.

2. The tire vulcanizer according to claim 1, wherein a point of effort of a force acting on the second rack from the first mold attaching part or the second mold attaching part is set to a location closer to the first rack than a central part of the bottom end surface of the second rack.

3. A tire vulcanizer, comprising:
a first mold attaching part to which a first mold is attached;
a second mold attaching part to which a second mold pressed on the first mold is attached;
a supporting part configured to support the first mold attaching part and the second mold attaching part;
a first rack, which has a plurality of first teeth arranged in a pressing direction in which the first mold attaching part and the second mold attaching part are pressed together, the first rack being provided to the supporting part;
a second rack, which has a plurality of second teeth capable of engaging with the plurality of first teeth of the first rack, the second rack being provided on the first mold attaching part or the second mold attaching part; and
a tilting restriction part configured to restrict tilt of the second rack derived from the pressing direction,
wherein the tilting restriction part comprises a second rack supporting part configured to support the second rack from an opposite side of the plurality of second teeth along a horizontal direction of the first and second racks, in a state where the first teeth and the second teeth engage each other, and
the second rack supporting part is connected to an actuator that is driven during engagement with the first teeth and the second teeth.

4. A tire vulcanizer, comprising:
a first mold attaching part to which a first mold is attached;
a second mold attaching part to which a second mold pressed on the first mold is attached;
a supporting part configured to support the first mold attaching part and the second mold attaching part;
a first rack, which has a plurality of first teeth arranged in a pressing direction in which the first mold attaching part and the second mold attaching part are pressed together, the first rack being provided to the supporting part;

a second rack, which has a plurality of second teeth capable of engaging with the plurality of first teeth of the first rack, the second rack being provided on the first mold attaching part or the second mold attaching part; and a tilting restriction part configured to restrict tilt of the second rack derived from the pressing direction, wherein the tilting restriction part comprises a holding part configured to hold the first rack and the second rack from outer peripheries of the first and second racks, in a state where the first teeth and the second teeth engage each other, and the holding part is connected to an actuator that is driven during engagement with the first teeth and the second teeth.

5. The tire vulcanizer according to claim 1, wherein the tilting restriction part comprises a second rack supporting part configured to support the second rack from an opposite side of the plurality of second teeth along a horizontal direction of the first and second racks, in a state where the first teeth and the second teeth engage each other, and the second rack supporting part is connected to an actuator that is driven during engagement with the first teeth and the second teeth.

6. The tire vulcanizer according to claim 2, wherein the tilting restriction part comprises a second rack supporting part configured to support the second rack from an opposite side of the plurality of second teeth along a horizontal direction of the first and second racks, in a state where the first teeth and the second teeth engage each other, and the second rack supporting part is connected to an actuator that is driven during engagement with the first teeth and the second teeth.

7. The tire vulcanizer according to claim 1, wherein the tilting restriction part comprises a holding part configured to hold the first rack and the second rack from outer peripheries of the first and second racks, in a state where the first teeth and the second teeth engage each other, and the holding part is connected to an actuator that is driven during engagement with the first teeth and the second teeth.

8. The tire vulcanizer according to claim 2, wherein the tilting restriction part comprises a holding part configured to hold the first rack and the second rack from outer peripheries of the first and second racks, in a state where the first teeth and the second teeth engage each other, and the holding part is connected to an actuator that is driven during engagement with the first teeth and the second teeth.

9. The tire vulcanizer according to claim 3, wherein the tilting restriction part comprises a holding part configured to hold the first rack and the second rack from outer peripheries of the first and second racks, in a state where the first teeth and the second teeth engage each other, and the holding part is connected to an actuator that is driven during engagement with the first teeth and the second teeth.

10. The tire vulcanizer according to claim 5, wherein the tilting restriction part comprises a holding part configured to hold the first rack and the second rack from outer peripheries of the first and second racks, in a state where the first teeth and the second teeth engage each other, and the holding part is connected to an actuator that is driven during engagement with the first teeth and the second teeth.

11. The tire vulcanizer according to claim 6, wherein the tilting restriction part comprises a holding part configured to hold the first rack and the second rack from outer peripheries of the first and second racks, in a state where the first teeth and the second teeth engage each other, and the holding part is connected to an actuator that is driven during engagement with the first teeth and the second teeth.

12. The tire vulcanizer according to claim 3, wherein a point of effort of a force acting on the second rack from the first mold attaching part or the second mold attaching part is set to a location closer to the first rack than a central part of a bottom end surface of the second rack.

13. The tire vulcanizer according to claim 4, wherein a point of effort of a force acting on the second rack from the first mold attaching part or the second mold attaching part is set to a location closer to the first rack than a central part of a bottom end surface of the second rack.

* * * * *